(12) United States Patent
Dalum

(10) Patent No.: US 9,283,954 B2
(45) Date of Patent: Mar. 15, 2016

(54) SYSTEM FOR AND METHOD OF FUEL OPTIMIZATION IN A HYBRID VEHICLE

(75) Inventor: Joseph Thomas Dalum, Delafield, WI (US)

(73) Assignee: Odyne Systems, LLC, Waukesha, WI (US)

( * ) Notice: Subject to any disclaimer, the term of this patent is extended or adjusted under 35 U.S.C. 154(b) by 0 days.

(21) Appl. No.: 13/812,723

(22) PCT Filed: Mar. 20, 2012

(86) PCT No.: PCT/US2012/029835
§ 371 (c)(1),
(2), (4) Date: Jan. 28, 2013

(87) PCT Pub. No.: WO2013/081657
PCT Pub. Date: Jun. 6, 2013

(65) Prior Publication Data
US 2013/0179007 A1    Jul. 11, 2013

Related U.S. Application Data

(60) Provisional application No. 61/566,526, filed on Dec. 2, 2011.

(51) Int. Cl.
*B60W 20/00* (2006.01)
*B60W 10/08* (2006.01)
(Continued)

(52) U.S. Cl.
CPC ............ *B60W 20/108* (2013.01); *B60W 10/06* (2013.01); *B60W 20/104* (2013.01); *G01C 21/3469* (2013.01); *B60W 10/08* (2013.01); *B60W 2530/14* (2013.01); *B60W 2550/40* (2013.01);
(Continued)

(58) Field of Classification Search
CPC ... B60W 20/108; B60W 10/06; B60W 10/08; Y10S 903/93
USPC ......... 180/65.22, 65.245–65.265, 165, 65.31; 477/54, 107, 110, 168; 701/1, 2, 48; 903/930
See application file for complete search history.

(56) References Cited

U.S. PATENT DOCUMENTS

| 2,581,010 A | 1/1952 | Findley et al. |
| 2,968,915 A | 1/1961 | Feistel, Jr. |
| 3,299,983 A | 1/1967 | Hubbard |

(Continued)

FOREIGN PATENT DOCUMENTS

| CN | 1647968 A | 8/2005 |
| CN | 101011964 A | 8/2007 |

(Continued)

OTHER PUBLICATIONS

Office Action for U.S. Appl. No. 13/629,533, mail date Jun. 5, 2013, 9 pages.

(Continued)

*Primary Examiner* — James Trammell
*Assistant Examiner* — Majdi Alsomiri
(74) *Attorney, Agent, or Firm* — Foley & Lardner LLP

(57) ABSTRACT

One embodiment relates to a system for idle reduction in a hybrid vehicle. The system includes a control system for causing the vehicle to operate in a charge depletion mode, or a charge accumulation mode in response to job site data; the job site data can include an estimate of the amount of energy required at the job site.

30 Claims, 9 Drawing Sheets

(51) Int. Cl.
*B60W 10/06* (2006.01)
*G01C 21/34* (2006.01)

(52) U.S. Cl.
CPC .......... *B60Y 2200/41* (2013.01); *Y02T 10/6286* (2013.01); *Y10S 903/93* (2013.01)

(56) References Cited

U.S. PATENT DOCUMENTS

| | | | |
|---|---|---|---|
| 3,923,115 | A | 12/1975 | Helling |
| 4,443,752 | A | 4/1984 | Newman |
| 4,588,040 | A * | 5/1986 | Albright et al. ............... 180/165 |
| 4,918,690 | A | 4/1990 | Markkula et al. |
| 4,941,143 | A | 7/1990 | Twitty et al. |
| 4,948,050 | A | 8/1990 | Picot |
| 4,955,018 | A | 9/1990 | Twitty et al. |
| 4,959,962 | A | 10/1990 | Hagin et al. |
| 4,962,462 | A | 10/1990 | Fekete |
| 4,969,147 | A | 11/1990 | Markkula et al. |
| 4,993,780 | A | 2/1991 | Tanaka et al. |
| 5,190,118 | A | 3/1993 | Yelton |
| 5,195,600 | A | 3/1993 | Dorgan |
| 5,242,278 | A | 9/1993 | Vanderslice et al. |
| 5,297,143 | A | 3/1994 | Fridrich et al. |
| 5,315,227 | A | 5/1994 | Pierson et al. |
| 5,318,142 | A | 6/1994 | Bates et al. |
| 5,319,641 | A | 6/1994 | Fridrich et al. |
| 5,366,827 | A | 11/1994 | Belanger et al. |
| 5,373,198 | A | 12/1994 | Lopez |
| 5,394,089 | A | 2/1995 | Clegg |
| 5,420,572 | A | 5/1995 | Dolin et al. |
| 5,492,189 | A | 2/1996 | Kriegler et al. |
| 5,495,912 | A | 3/1996 | Gray et al. |
| 5,500,852 | A | 3/1996 | Riley |
| 5,513,324 | A | 4/1996 | Dolin et al. |
| 5,519,878 | A | 5/1996 | Dolin, Jr. |
| 5,558,588 | A | 9/1996 | Schmidt |
| 5,568,037 | A | 10/1996 | Massaroni et al. |
| 5,569,552 | A | 10/1996 | Rao et al. |
| 5,620,057 | A | 4/1997 | Klemen et al. |
| 5,625,272 | A | 4/1997 | Takahashi |
| 5,635,805 | A | 6/1997 | Ibaraki et al. |
| 5,669,842 | A | 9/1997 | Schmidt |
| 5,701,068 | A | 12/1997 | Baer et al. |
| 5,806,617 | A * | 9/1998 | Yamaguchi ............... 180/65.235 |
| 5,866,276 | A | 2/1999 | Ogami et al. |
| 5,867,009 | A | 2/1999 | Kiuchi et al. |
| 5,887,674 | A | 3/1999 | Gray, Jr. |
| 5,923,093 | A | 7/1999 | Tabata et al. |
| 5,985,483 | A | 11/1999 | Verhoog et al. |
| 6,037,749 | A | 3/2000 | Parsonage |
| 6,042,961 | A | 3/2000 | Verhoog et al. |
| 6,048,288 | A | 4/2000 | Tsujii et al. |
| 6,057,050 | A | 5/2000 | Parise |
| 6,165,102 | A | 12/2000 | Bellinger |
| 6,198,387 | B1 * | 3/2001 | Dalum et al. .................. 340/436 |
| 6,220,733 | B1 | 4/2001 | Gordon |
| 6,251,042 | B1 | 6/2001 | Peterson et al. |
| 6,269,895 | B1 | 8/2001 | Tanuguchi et al. |
| 6,316,841 | B1 | 11/2001 | Weber |
| 6,395,417 | B1 | 5/2002 | Frazier |
| 6,456,041 | B1 | 9/2002 | Terada et al. |
| 6,484,830 | B1 | 11/2002 | Gruenwald et al. |
| 6,502,393 | B1 | 1/2003 | Stephenson et al. |
| 6,511,399 | B2 | 1/2003 | McCollum et al. |
| 6,518,732 | B2 | 2/2003 | Palanisamy |
| 6,524,084 | B2 | 2/2003 | Neumair |
| 6,524,743 | B2 | 2/2003 | Vackar |
| 6,579,642 | B2 | 6/2003 | Yamane et al. |
| 6,590,363 | B2 | 7/2003 | Teramoto |
| 6,598,496 | B2 | 7/2003 | Pannell |
| 6,617,826 | B2 | 9/2003 | Liao et al. |
| 6,651,759 | B1 | 11/2003 | Gruenwald et al. |
| 6,653,002 | B1 | 11/2003 | Parise |
| 6,658,852 | B2 | 12/2003 | Frey |
| 6,666,022 | B1 | 12/2003 | Yoshimatsu et al. |
| 6,672,415 | B1 * | 1/2004 | Tabata ....................... 180/65.25 |
| 6,692,395 | B2 | 2/2004 | Rodeghiero et al. |
| 6,705,416 | B1 | 3/2004 | Glonner et al. |
| 6,708,787 | B2 | 3/2004 | Naruse et al. |
| 6,718,782 | B2 | 4/2004 | Egami |
| 6,719,080 | B1 | 4/2004 | Gray, Jr. |
| 6,724,165 | B2 | 4/2004 | Hughes |
| 6,725,581 | B2 | 4/2004 | Naruse et al. |
| 6,751,960 | B2 | 6/2004 | Arimitsu |
| 6,798,165 | B2 | 9/2004 | Cartwright et al. |
| 6,834,737 | B2 | 12/2004 | Bloxham |
| 6,880,651 | B2 | 4/2005 | Loh et al. |
| 6,882,129 | B2 | 4/2005 | Boskovitch et al. |
| 6,885,920 | B2 | 4/2005 | Yakes et al. |
| 6,907,948 | B2 | 6/2005 | Wakashiro et al. |
| 6,922,990 | B2 | 8/2005 | Naruse et al. |
| 6,945,039 | B2 | 9/2005 | Yoshino |
| 6,945,893 | B2 | 9/2005 | Grillo et al. |
| 6,962,093 | B2 | 11/2005 | Warner |
| 6,969,921 | B2 | 11/2005 | Yoshimatsu |
| 7,004,273 | B1 | 2/2006 | Gruenwald et al. |
| 7,017,348 | B2 | 3/2006 | Tajima et al. |
| 7,086,226 | B2 | 8/2006 | Oguri |
| 7,096,985 | B2 | 8/2006 | Charaudeau et al. |
| 7,104,920 | B2 | 9/2006 | Beaty et al. |
| 7,119,454 | B1 | 10/2006 | Chiao |
| 7,125,357 | B2 | 10/2006 | Porter |
| 7,147,071 | B2 | 12/2006 | Gering et al. |
| 7,182,583 | B2 | 2/2007 | Gandrud et al. |
| 7,185,722 | B1 | 3/2007 | Sakamoto et al. |
| 7,190,133 | B2 | 3/2007 | King et al. |
| 7,207,404 | B2 | 4/2007 | Ito et al. |
| 7,207,916 | B2 | 4/2007 | Rodeghiero et al. |
| 7,219,000 | B2 | 5/2007 | Steinmetz et al. |
| 7,251,265 | B2 | 7/2007 | Yakymyshyn et al. |
| 7,252,165 | B1 | 8/2007 | Gruenwald et al. |
| 7,258,183 | B2 | 8/2007 | Leonardi et al. |
| 7,273,122 | B2 | 9/2007 | Rose |
| 7,275,917 | B1 | 10/2007 | Hicks |
| 7,277,782 | B2 | 10/2007 | Yakes et al. |
| 7,293,621 | B2 | 11/2007 | Long |
| 7,298,102 | B2 | 11/2007 | Sopko et al. |
| 7,315,090 | B2 | 1/2008 | Yang |
| 7,345,441 | B2 | 3/2008 | Yoshimatsu |
| 7,375,492 | B2 | 5/2008 | Calhoon et al. |
| 7,391,129 | B2 | 6/2008 | Chiao et al. |
| 7,427,156 | B2 | 9/2008 | Ambrosio et al. |
| 7,448,981 | B2 | 11/2008 | Mashiki |
| 7,471,066 | B2 | 12/2008 | Ambrosio et al. |
| 7,487,023 | B2 | 2/2009 | Komiyama et al. |
| 7,520,354 | B2 | 4/2009 | Morrow et al. |
| 7,575,287 | B2 | 8/2009 | Matsuura et al. |
| 7,597,172 | B1 | 10/2009 | Kovach et al. |
| 7,600,595 | B2 | 10/2009 | Harris |
| 7,610,976 | B2 | 11/2009 | Holmes et al. |
| 7,641,018 | B2 | 1/2010 | Bissontz |
| 7,657,350 | B2 | 2/2010 | Moran |
| 7,658,250 | B2 | 2/2010 | Betz et al. |
| 7,662,062 | B2 | 2/2010 | Yang |
| 7,665,559 | B2 | 2/2010 | De La Torre-Bueno |
| 7,669,414 | B2 | 3/2010 | Loeffler |
| 7,670,253 | B2 | 3/2010 | Sah |
| 7,683,569 | B2 | 3/2010 | Bloomfield |
| 7,689,331 | B2 | 3/2010 | Moran |
| 7,728,449 | B2 | 6/2010 | Kagoshima et al. |
| 7,806,801 | B2 | 10/2010 | Gohring et al. |
| 7,841,432 | B2 | 11/2010 | Lynn et al. |
| 7,854,282 | B2 | 12/2010 | Lee et al. |
| 7,859,202 | B2 | 12/2010 | Lukic et al. |
| 7,900,724 | B2 | 3/2011 | Promersberger et al. |
| 7,914,924 | B2 | 3/2011 | Sugeno et al. |
| 7,921,950 | B2 | 4/2011 | Harris |
| 7,954,581 | B2 | 6/2011 | Tanishima |
| 7,994,221 | B2 | 8/2011 | Dai et al. |
| 8,115,450 | B2 | 2/2012 | Ambrosio et al. |
| 8,190,318 | B2 | 5/2012 | Li et al. |
| 8,275,528 | B2 | 9/2012 | Kresse |
| 2002/0104300 | A1 | 8/2002 | Hunt |

(56) References Cited

U.S. PATENT DOCUMENTS

| | | |
|---|---|---|
| 2003/0062205 A1 | 4/2003 | Konrad et al. |
| 2003/0103850 A1 | 6/2003 | Szulczewski |
| 2003/0162631 A1 | 8/2003 | Williams |
| 2004/0207205 A1 | 10/2004 | Kikuchi et al. |
| 2004/0207350 A1 | 10/2004 | Wilton et al. |
| 2004/0251065 A1 | 12/2004 | Komiyama et al. |
| 2005/0139399 A1 | 6/2005 | Gopal |
| 2005/0271934 A1 | 12/2005 | Kiger et al. |
| 2006/0068970 A1 | 3/2006 | Rose |
| 2006/0116797 A1 | 6/2006 | Moran |
| 2007/0001616 A1 | 1/2007 | Puccetti et al. |
| 2007/0095587 A1 | 5/2007 | DuCharme |
| 2007/0107958 A1* | 5/2007 | Oliver .......................... 180/65.4 |
| 2007/0158118 A1 | 7/2007 | King |
| 2007/0181355 A1* | 8/2007 | Harris .......................... 180/65.2 |
| 2007/0227801 A1* | 10/2007 | Loeffler ....................... 180/305 |
| 2007/0246274 A1* | 10/2007 | Dreibholz et al. ........... 180/65.2 |
| 2008/0093143 A1 | 4/2008 | Harrison |
| 2008/0141800 A1 | 6/2008 | Seitz et al. |
| 2008/0234097 A1 | 9/2008 | Sah |
| 2008/0243324 A1 | 10/2008 | Harris |
| 2008/0264189 A1 | 10/2008 | Hancock |
| 2008/0288132 A1* | 11/2008 | King et al. ....................... 701/22 |
| 2009/0018716 A1 | 1/2009 | Ambrosio |
| 2009/0095549 A1* | 4/2009 | Dalum et al. ............. 180/65.265 |
| 2009/0096424 A1 | 4/2009 | Ambrosio et al. |
| 2009/0259355 A1 | 10/2009 | Li |
| 2010/0065358 A1* | 3/2010 | Harris ...................... 180/65.265 |
| 2010/0219007 A1* | 9/2010 | Dalum et al. .............. 180/65.22 |
| 2011/0022259 A1 | 1/2011 | Niwa |
| 2011/0190968 A1 | 8/2011 | Fleming |
| 2012/0266701 A1 | 10/2012 | Yamada et al. |

FOREIGN PATENT DOCUMENTS

| | | |
|---|---|---|
| CN | 103287260 | 9/2013 |
| DE | 2701301 A1 | 7/1978 |
| DE | 4024384 A1 | 2/1992 |
| DE | 4102822 A1 | 8/1992 |
| DE | 4204384 A1 | 8/1993 |
| DE | 19748423 A1 | 2/1999 |
| DE | 10203514 A1 | 8/2003 |
| EP | 0492152 A1 | 7/1992 |
| EP | 2055548 | 5/2009 |
| JP | 8308020 A | 11/1996 |
| JP | 08-322107 A | 12/1996 |
| JP | 10-037904 | 2/1998 |
| JP | H10-037904 | 2/1998 |
| JP | H11-115743 A | 4/1999 |
| JP | 2000-115912 | 4/2000 |
| JP | 2000-170888 | 6/2000 |
| JP | 2001-008309 A | 1/2001 |
| JP | 2001-112117 A | 4/2001 |
| JP | 2001-254643 | 9/2001 |
| JP | 2002-171601 A | 6/2002 |
| JP | 2003-191762 A | 7/2003 |
| JP | 2004-006136 A | 1/2004 |
| JP | 2004-166363 A | 6/2004 |
| JP | 2007-069788 | 3/2007 |
| JP | 2007-106385 | 4/2007 |
| JP | 2007-107231 | 4/2007 |
| JP | 2007-177694 A | 7/2007 |
| JP | 9163616 A | 7/2009 |
| JP | 2009-292287 A | 12/2009 |
| JP | 2011-525448 A | 9/2011 |
| WO | WO 92/01584 A1 | 2/1992 |
| WO | WO-2007/097819 | 8/2007 |
| WO | WO 2009/009078 A1 | 1/2009 |
| WO | WO 2009/049066 | 4/2009 |
| WO | WO-2009/088406 A2 | 7/2009 |
| WO | WO-2009/117574 | 9/2009 |

OTHER PUBLICATIONS

English Translation of Chinese Office Action and Search Report for Application No. 2008801170943, dated Apr. 11, 2013, 14 pages.

International Search Report and Written Opinion for PCT Application No. PCT/US2012/029835, mail date Dec. 26, 2012, 7 pages.

AZD, Azure Dynamics, Electric Drive Solutions, AZD Force Drive, We Drive a World of Difference; available at least by May 30, 2008, 2 pages.

AZD, Azure Dynamics, Force Drive Electric Solutions, Force Drive Electric Vehicles Zero Emissions, http://www.azuredynamics.com/products/force-drive/traction-motors.htm; retrieved on Sep. 17, 2008, 2 pages.

AZD, Azure Dynamics, LEEP, Low Emission Electric Power System, AZD Has One of the Largest Hybrid Technology Engineering Teams in the World; available at least by May 30, 2008, 2 pages.

AZD, Azure Dynamics, Parallel Hybrid Electric Ford E450 Cutaway and Strip Chassis, available at least by May 30, 2008, 2 pages.

AZD, Azure Dynamics, Series Hybrid Electric Azure CitiBus, Our drive can make your difference; available at least by May 30, 2008, 2 pages.

Balance Hybrid Electric E450 Drive System Hybrid Trucks, http://www.azuredynamics.com/products/balance-hybrid-electric.htm; retrieved on Sep. 17, 2008, 2 pages.

Blanco, Odyne, Dueco Will Build PHV Aerial Lift Truck, http://autobloggreen.com/2007/05/07/odyne-dueco-will Build-phev-aerial-lift-truck/, retrieved on Jan. 3, 2009, 6 pages.

CAI, Integrated Starter Alternator, Automotive Power Electronics and Motor Drives, 2005, 55 pages.

CitiBus Hybrid Electric StarTrans, CitiBus HD Senator, http://www.azuredynamics.com/products/citibus-hybrid-electric.htm; retrieved on Sep. 17, 2008, 1 page.

Dueco, Hybrid Vehicle, TL50M Dueco's Plug-In Hybrid Electric Vehicle (PHEV), www.dueco.com, available at least by May 30, 2008, 1 page.

Dueco/Odyne Corporation, Partners in Green Technology for the Utility Industry, Hybrid Power, PHEV-Diesel Electric, www.dueco.com, available at least by May 30, 2008, 1 page.

Eaton, Freightliner LLC, Daimler Chrysler Truck Group, M2 Proof of Concept HEV Utility Truck Specs; available at least by May 30, 2008, 2 pages.

Eaton, Hybrid Power Systems, Roadranger, Eaton's Medium-Duty Hybrid Electric System Provides Up to 60% Fuel Savings and Significantly Reduces Emissions as Compared to a Conventional Drivetrain, www.roadranger.com., 2006, 2 pages.

Green Car Congress, Nissan Adds Diesel Hybrid and CNG Models to Atlas H43 Lineup, http://www.greencarcongress.com/2007/09/nissan-adds-die.html; retrieved on Jun. 23, 2009, 2 pages.

Hodges, Is There a Hybrid in Your Future?, http://www.lmtruck.com/articles/petemplate.aspx?storyid=116, retrieved on Jun. 6, 2008, 6 pages.

Hybrid Electric Vehicles LEEP Systems/Azure Dynamics, LEEP Systems/Freeze/Lift, http://www.azuredynamics.com/products/leep-system.htm, retrieved on Sep. 17, 2008, 1 page.

HyPower by Terex, Low Carbon Footprint, Plug-In Power Hybrid System, 2009, 2 pages.

Isuzu ELF Diesel Hybrid Description from Isuzu.com, different pages of complete report retrieved from web.archieve.org on various dates such as May 9, 2006, Sep. 5, 2006, Oct. 31, 2006, for the pages included with the Office Action for U.S. Appl. No. 12/130,888, 6 pages.

Isuzu Introduction of ELF Diesel Hybrid, http://www.isuzu.co.jp/world/technology/randd/project6/01.html, retrieved on Nov. 1, 2007, 2 pages.

Isuzu Low Pollution Alternative Fuel Vehicles, http://www.isuzu.co.jp/world/technology/low/index.html, retrieved on Jun. 22, 2009, 3 pages.

Li et al., Power Management System for Plug-In Hybrid Electric Vehicles, 2012, 2 pages.

(56) References Cited

OTHER PUBLICATIONS

Li, Trip Based Optimal Power Management for Plug-In Hybrid Electric Vehicles, OTT ID #1127, Mar. 9, 2012, 20 pages.
Odyne Corp. Receives Order for Twenty-Five Plug-In Hybrid Systems from Dueco, Inc., http://www.businesswire.com/portal/site/home/index.jsp?epi_menuItemID=887566059a3ae . . . , retrieved on Jan. 3, 2008, 4 pages.
Ogando, Hydraulic Powertrains Propel These Hybrid Trucks; http://www.designnews.com/article/CA6451735.html?nid=2874#_self; Jun. 13, 2007; 5 pages.
Palumbo et al., Ultracapacitor Based Hybrid Booster Drive®, Jun. 2004, 16 pages.
Powderly, Odyne to Ship 25 Plug-In Systems to Dueco Inc., http://www.libn.com/breakingnews.htm?articleID=9497, Dec. 20, 2007, 2 pages.
Sherosky, Stop-Start Technology Especially Challenging for Micro-Hybrid Engineers, Torque News, Jan. 28, 2011, 3 pages.
ThomasNet, Aerial Lift Truck Delivers Plug-In Hybrid Functionality, http://news.thomasnet.com/fullstory/535299, retrieved on Jan. 3, 2008, 4 pages.
Vasilash, Power Trains 2005, Hybrid Powertrains: The Two-Mode Approach, http://www.autofieldguide.com/articles/article_print1.cfm, retrieved on Jun. 24, 2009, 3 pages.
Vehicle Technology.org, Advanced GM Allison Two-Mode Parallel Hybrid Technology Ready for Europe, http://www.vehicletecnology.org/vt2007/36.html, retrieved on Jun. 6, 2008, 2 pages.
Vehicle Technology.org, Advanced GM Allison Two-Mode Parallel Hybrid Technology Ready for Europe, http://www.vehicletecnology.org/vt2007/37.html, retrieved on Jun. 6, 2008, 2 pages.
Vehicle Technology.org, Advanced GM Allison Two-Mode Parallel Hybrid Technology Ready for Europe, Energy Storage System (ESS), http://www.vehicletecnology.org/vt2007/38.html, retrieved on Jun. 22, 2009, 3 pages.
Office Action for U.S. Appl. No. 11/312,803, mail date Dec. 14, 2007, 7 pages.
Notice of Allowance for U.S. Appl. No. 11/312,803, mail date Jun. 2, 2008, 7 pages.
Office Action for U.S. Appl. No. 11/315,927, mail date Nov. 21, 2007, 19 pages.
Office Action for U.S. Appl. No. 11/315,927, mail date Aug. 19, 2008, 15 pages.
Notice of Allowance for U.S. Appl. No. 11/315,927, mail date Sep. 29, 2008, 7 pages.
Office Action for U.S. Appl. No. 11/322,024, mail date May 29, 2007, 9 pages.
Notice of Allowance for U.S. Appl. No. 11/322,024, mail date Nov. 15, 2007, 6 pages.
Office Action for U.S. Appl. No. 11/329,018, mail date Oct. 14, 2008, 12 pages.
Office Action for U.S. Appl. No. 11/329,018, mail date Jun. 25, 2009, 16 pages.
Office Action for U.S. Appl. No. 11/329,018, mail date Dec. 18, 2009, 13 pages.
Notice of Allowance for U.S. Appl. No. 11/329,018, mail date Jun. 25, 2010, 7 pages.
Office Action for U.S. Appl. No. 12/710,247, mail date Apr. 10, 2012, 17 pages.
Office Action for U.S. Appl. No. 12/710,247, mail date Aug. 27, 2012, 5 pages.
Notice of Allowance for U.S. Appl. No. 12/710,247, mail date Nov. 26, 2012, 8 pages.
Office Action for U.S. Appl. No. 12/130,888, mail date Mar. 27, 2012, 18 pages.
Office Action for U.S. Appl. No. 12/217,407, mail date Jun. 21, 2011, 10 pages.
Office Action for U.S. Appl. No. 12/217,407, mail date Dec. 5, 2011, 10 pages.
Office Action for U.S. Appl. No. 12/217,407, mail date Jun. 6, 2012, 8 pages.
Office Action for U.S. Appl. No. 12/217,407, mail date Feb. 5, 2013, 10 pages.
Office Action for U.S. Appl. No. 12/284,612, mail date Mar. 16, 2011, 11 pages.
Notice of Allowance for U.S. Appl. No. 12/284,612, mail date Sep. 30, 2011, 8 pages.
Office Action for U.S. Appl. No. 12/316,494, mail date Jun. 9, 2009, 17 pages.
Office Action for U.S. Appl. No. 12/316,494, mail date Dec. 1, 2009, 15 pages.
Restriction Requirement for U.S. Appl. No. 13/629,533, mail date Feb. 28, 2013, 8 pages.
Japanese Office Action regarding Application No. 2010-516050, dated Oct. 9, 2012, 1 pages.
Japanese Office Action regarding Application No. 2010-529046, mail date Mar. 12, 2013, 2 pages.
Supplementary European Search Report for Application No. 08794431.0, mail date May 24, 2011, 7 pages.
European Office Action for Application No. 08794431.0, mail date Oct. 29, 2012, 4 pages.
European Office Action for Application No. 08837311.3, mail date Jan. 9, 2013, 6 pages.
Chinese Office Action for Application No. 200880105323.X, dated May 9, 2012, 8 pages.
Supplementary European Search Report for European Patent Application No. 08837311.3, mail date Sep. 1, 2011, 8 pages.
International Search Report and Written Opinion for International Appl. No. PCT/US2008/079376, mail date Apr. 9, 2009, 9 pgs.
International Search Report and Written Opinion for International Application No. PCT/US08/08442, mail date Sep. 26, 2008, 7 pages.
International Search Report and Written Opinion for International Application No. PCT/US2009/037664, mail date Aug. 3, 2009, 6 pages.
International Search Report and Written Opinion for PCT/US2009/066151 dated Jul. 15, 2010, 10 pages.
Office Action for U.S. Appl. No. 12/130,888, mail date Jun. 26, 2013, 15 pages.
Third Office Action for Chinese Application No. 200880105323.X, mail date Jul. 26, 2013, 4 pages.
International Search Report and Written Report for Application No. PCT/US2013/036431, mail date Jul. 23, 2013, 12 pages.
English Translation of Office Action for Chinese Application No. 2008801170943, mail date Nov. 26, 2013, 2 pages.
Office Action for Japanese Application No. 2010-529046, mail date Dec. 10, 2013.
2012 Honda Civic Hybrid v. 2011 Toyota Prius Five Comparison Test, www.edmunds.com/toyota/prius/2011/comparison-test.html, retrieved on Apr. 19, 2013, 9 pages.
Burke, A Deep Impression, Technology of Clean Air, Diesel Progress North American Edition, Jul. 2013, 3 pages.
Electric Hybrid, www.eaton.com/Eaton, ProductsServices/Truck/HybridPower/SystemsOveriview/El . . . , retrieved on Oct. 25, 2013, 1 page.
Integrated Motor Assist (IMA), http://wikicars.org/es/Integrated_Motor_Assist_(IMA), retrieved on Apr. 19, 2013, 7 pages.
Integrated Motor Assist, http://en.wikipedia.org/wiki/Integrated_Motor_Assist, retrieved on Oct. 7, 2013, 3 pages.
Office Action for U.S. Appl. No. 12/217,407, mail date Oct. 22, 2013, 10 pages.
Office Action for U.S. Appl. No. 13/629,533, mail date Nov. 6, 2013, 7 pages.
Office Action for Japanese Application No. 2010-516050, mail date Nov. 5, 2013, 6 pages.
Notice of Allowance on U.S. Appl. No. 12/217,407 Dated Mar. 27, 2014, 10 pages.
Office Action on U.S. Appl. No. 12/130,888 Dated Feb. 19, 2014, 16 pages.
Office Action on U.S. Appl. No. 13/397,561 Dated Mar. 19, 2014, 9 pages.
Fourth Office Action with English Translation in Chinese Patent Application No. 200880117094, dated Jun. 4, 2014, 7 pages.
International Preliminary Report on Patentability for PCT Application No. PCT/US2012/029835, dated Jun. 3, 2014, 5 pages.

(56) References Cited

OTHER PUBLICATIONS

Office Action on U.S. Appl. No. 13/629,533 dated May 21, 2014, 16 pages.
Office Action on U.S. Appl. No. 14/081,892 Dated Jun. 4, 2014, 11 pages.
Second Office Action in Chinese Patent Application No. 200880117094 with English Translation, dated Jun. 4, 2014, 4 pages.
International Preliminary Report on Patentability received in PCT Application No. PCT/US2013/036431, dated Oct. 14, 2014, 6 pages.
Notice of Allowance for U.S. Appl. No. 13/629,533 Dated Jul. 30, 2014, 7 pages.
Notice of Allowance for U.S. Appl. No. 12/130,888 Dated Oct. 17, 2014, 7 pages.
Office Action on Canadian Patent Application No. 2,693,536, dated Aug. 26, 2014, 2 pages.
Office Action on U.S. Appl. No. 14/081,892 Dated Oct. 21, 2014, 12 pages.
Final Office Action on U.S. Appl. No. 13/397,561 Dated Nov. 5, 2014, 8 pages.
First Office Action on Korean Patent Application 10-2010-7010085, Dated Dec. 17, 2014, 8 pages.
Office Action on Canadian Patent Application 2,702,089, dated Nov. 4, 2014, 3 pages.
Office Action on Japanese Patent Application 2010-516050, dated Nov. 25, 2014, 6 pages.
Notice of Allowance for U.S. Appl. No. 14/081,892, dated Feb. 3, 2015, 9 pages.
International Search Report and Written Opinion received in PCT Application No. PCT/US2014/066223, dated Feb. 24, 2015, 11 pages.
Final Office Action for Korean Patent Application No. 10-2010-7010085, dated Aug. 28, 2015, 6 pages.
First Office Action and Search Report on Chinese Patent Application No. 201410058501.5 dated Jul. 24, 2015, 15 pages.
Office Action on Japanese Application No. 2014-080127, Dated Jun. 23, 2015, 4 pages.
Office Action on Japanese Patent Application No. 2014-544723, dated Nov. 4, 2015, 13 pages.

* cited by examiner

SYSTEM FOR AND METHOD OF FUEL OPTIMIZATION IN A HYBRID VEHICLE

CROSS-REFERENCE TO RELATED PATENT APPLICATIONS

This application claims the benefit of and priority to PCT/US2012/029835, which claims the benefit of and priority to U.S. Provisional Patent Application No. 61/566,526 by Dalum, filed Dec. 2, 2011, both incorporated herein by reference. This application is also related to U.S. patent application Ser. No. 12/710,247, filed Feb. 22, 2010 by Dalum et al. which is: a continuation of U.S. patent application Ser. No. 12/130,888, filed May 30, 2008, which claims the benefit of priority under 35 U.S.C. §119(e) to U.S. Provisional Application No. 60/979,755, filed Oct. 12, 2007, and U.S. Provisional Application No. 61/014,406, filed Dec. 17, 2007; a continuation-in-part of U.S. patent application Ser. No. 12/217,407, filed Jul. 3, 2008, which claims the benefit of priority under 35 U.S.C. §119(e) to U.S. Provisional Application No. 60/959,181, filed Jul. 12, 2007, and U.S. Provisional Application No. 61/126,118, filed May 1, 2008; a continuation-in-part of PCT/US2009/066151, filed Nov. 30, 2009, which claims the benefit of priority to U.S. Provisional Application No. 61/177,240, filed May 11, 2009, and U.S. Provisional Application No. 61/118,980, filed Dec. 1, 2008, and U.S. Provisional Application No. 61/235,998, filed Aug. 21, 2009, and U.S. Provisional Application No. 61/251,285, filed Oct. 13, 2009; is a continuation-in-part of PCT/US2008/008442, filed Jul. 10, 2008; is a continuation-in-part of PCT/US2008/079376, filed Oct. 9, 2008, which is a continuation of U.S. application Ser. No. 12/130,888, filed on May 30, 2008, which claims the benefit of priority to U.S. Provisional Application No. 60/979,755, filed on Oct. 12, 2007, and U.S. Provisional Application No. 61/014,406, filed on Dec. 17, 2007 and each of the applications listed herein; each of the above references is incorporated herein by reference in its entirety.

BACKGROUND OF THE INVENTION

The present disclosure relates to vehicle drive systems. More particularly, the present disclosure relates to a system for and method of optimizing the use of stored energy or power for a hybrid vehicle that is utilized for transit and stationary operation.

Hybrid vehicle drive systems commonly employ at least two prime movers arranged in different configurations relative to a transmission. One known configuration is found in so-called "series-parallel" hybrids. "Series-parallel" hybrids are arranged such that multiple prime movers can power the drive shaft alone or in conjunction with one another.

In a hybrid vehicle drive system, a first and second prime mover (e.g., an internal combustion engine and an electric motor/generator) can be arranged in a parallel configuration and used to provide power to a drive shaft and a power take-off (PTO) shaft through a transmission or to provide power through a transmission or through a shaft and PTO to a transmission. PTO shafts are generally used to drive auxiliary systems, accessories, or other machinery (e.g., pumps, mixers, barrels, winches, blowers, etc.).

Stored power or energy may be used to drive auxiliary systems or other devices when the hybrid vehicle is stationary, such as at a job site. To meet various anti-idle and emission regulations, it may be desirable to power the auxiliary systems and components with stored electrical power instead of with power from an internal combustion engine. The rate at which stored energy is used (varying the power) or stored and the amount of stored energy in a hybrid system can have varying effects on overall vehicle efficiency depending upon how the energy is used during driving. If the vehicle is also a work truck or vehicle, the use of stored energy from a hybrid system can also have differing effects on efficiency at the jobsite, or on overall efficiency if a vehicle is used both in a driving mode and at jobsites. Therefore, there is a need to optimize the use of stored power or energy at job sites and along transportation routes. Because a hybrid vehicle has a finite power storage capacity, there is a need to monitor, predict and control the use of stored electrical power during the transit of the hybrid and during the stationary job needs. Further, there is a need to provide a system for and method of maintaining a sufficient amount of stored power or energy for expected stationary job needs of the hybrid vehicle.

SUMMARY OF THE INVENTION

One embodiment of the disclosure relates to a system for idle reduction in a hybrid vehicle. The system includes a control system for causing the vehicle to operate in a charge depletion mode, or a charge accumulation mode in response to job site data, the job site data including an estimate of the amount of energy required at the job site.

Another embodiment of the disclosure relates to a method of optimizing energy utilization by a hybrid vehicle. In one embodiment, the method can determine the best use of stored energy to improve efficiency or achieve other goals, such as operating equipment at a jobsite with the engine off. The method includes receiving locations of a plurality of job sites on a route; determining expected energy use at the job sites; determining if the expected energy use is greater than stored energy in rechargeable energy sources aboard the vehicle; and operating the vehicle in a charge depletion mode along the route if the expected energy use is less than stored energy in rechargeable energy sources aboard the vehicle.

Still another embodiment of the disclosure relates to an apparatus including a control system for causing a vehicle to operate in a charge depletion mode, or a charge accumulation mode in response to a command. The apparatus also includes a command control system for providing the command in response to job site data, the job site data including an estimate of the amount of energy required at the job site. Optionally, the apparatus may use other inputs to vary the charge deplete or charge accumulation mode of the hybrid system while the vehicle is in transit along with job site data to optimize the overall efficiency of the vehicle.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, claims, and the accompanying exemplary embodiments shown in the drawings, which are briefly described below.

DETAILED DESCRIPTION OF THE PREFERRED EMBODIMENTS

Hybrid systems used in larger trucks, greater than 10,000 pounds gvwr, have typically utilized two basic design configurations—a series design or a parallel design. Series design configurations typically use an internal combustion engine (heat engine) or fuel cell with a generator to produce electricity for both the battery pack and the electric motor. There is typically no direct mechanical power connection between the internal combustion engine or fuel cell (hybrid power unit) and the wheels in an electric series design. Parallel design configurations have a direct mechanical connection between the internal combustion engine or fuel cell (hybrid power unit) and the wheels in addition to an electric motor to drive the wheels. Although certain hybrid arrangements are described herein, the present invention can be used with various hybrid arrangements including series, parallel and series/parallel designs. A PTO-based hybrid is not shown in a limiting fashion.

Hybrid vehicle drive systems according to several possible embodiments are presented. One feature of one exemplary embodiment of the hybrid vehicle drive system is that a drive shaft can be powered singly or in any combination by one or more prime movers and accessories. In some embodiments, prime movers and accessories may themselves be powered by a wide variety of energy sources such as chemical (e.g., gasoline, diesel fuel, etc.), hydraulic, pneumatic, or electrical. Preferred embodiments incorporate hydraulic systems into the hybrid vehicle drive system for optimal energy storage and usage. It is noted that the term motor as used herein can refer to a motor, a pump, a motor/generator or a motor/pump and is not necessarily limited to a device that performs only motor or only pump operations.

Figure 1:
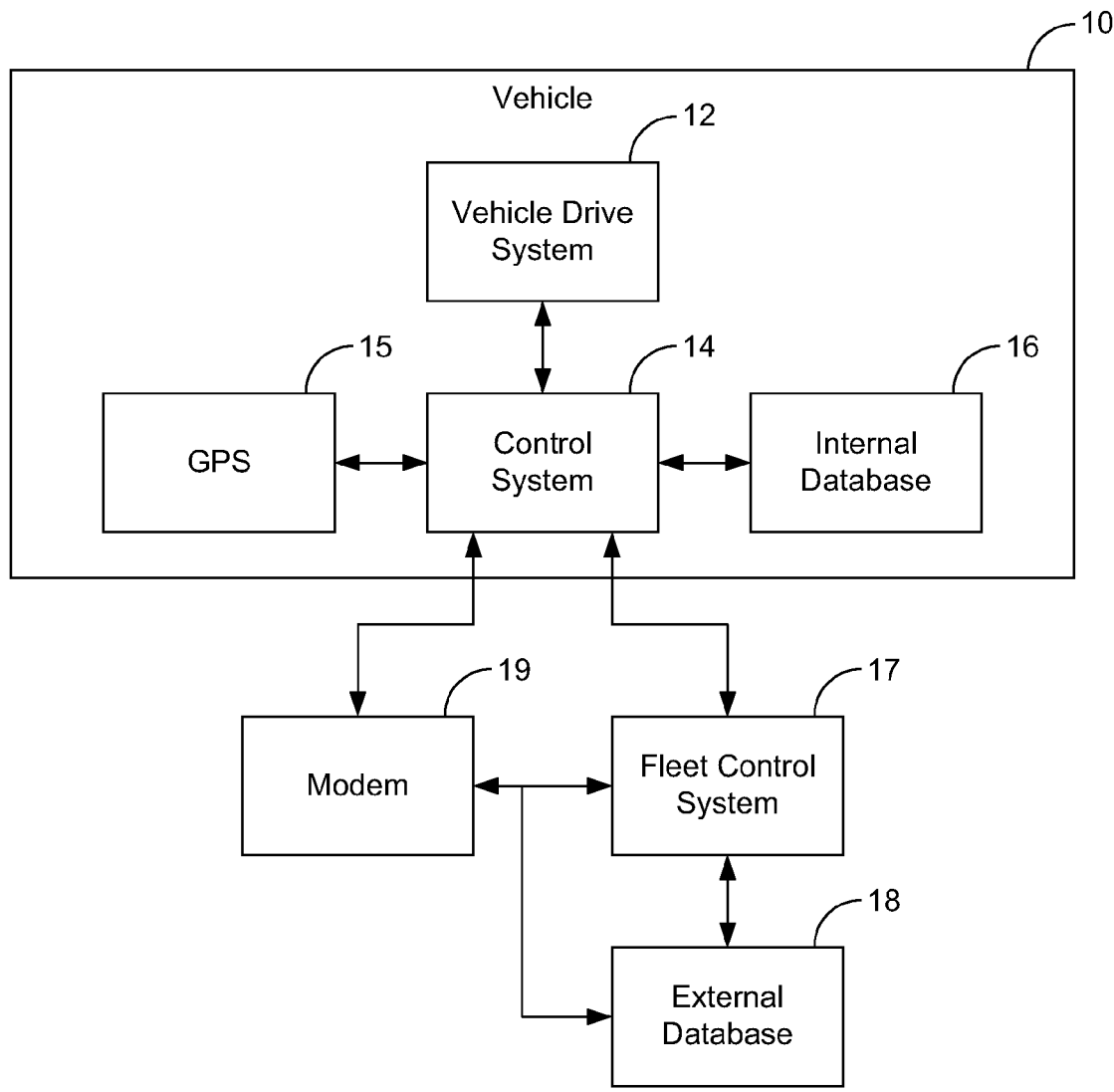
FIG. 1 is a schematic block diagram of an energy optimization system for a hybrid vehicle with a system, in accordance with an exemplary embodiment of the disclosure.
Figure 2:
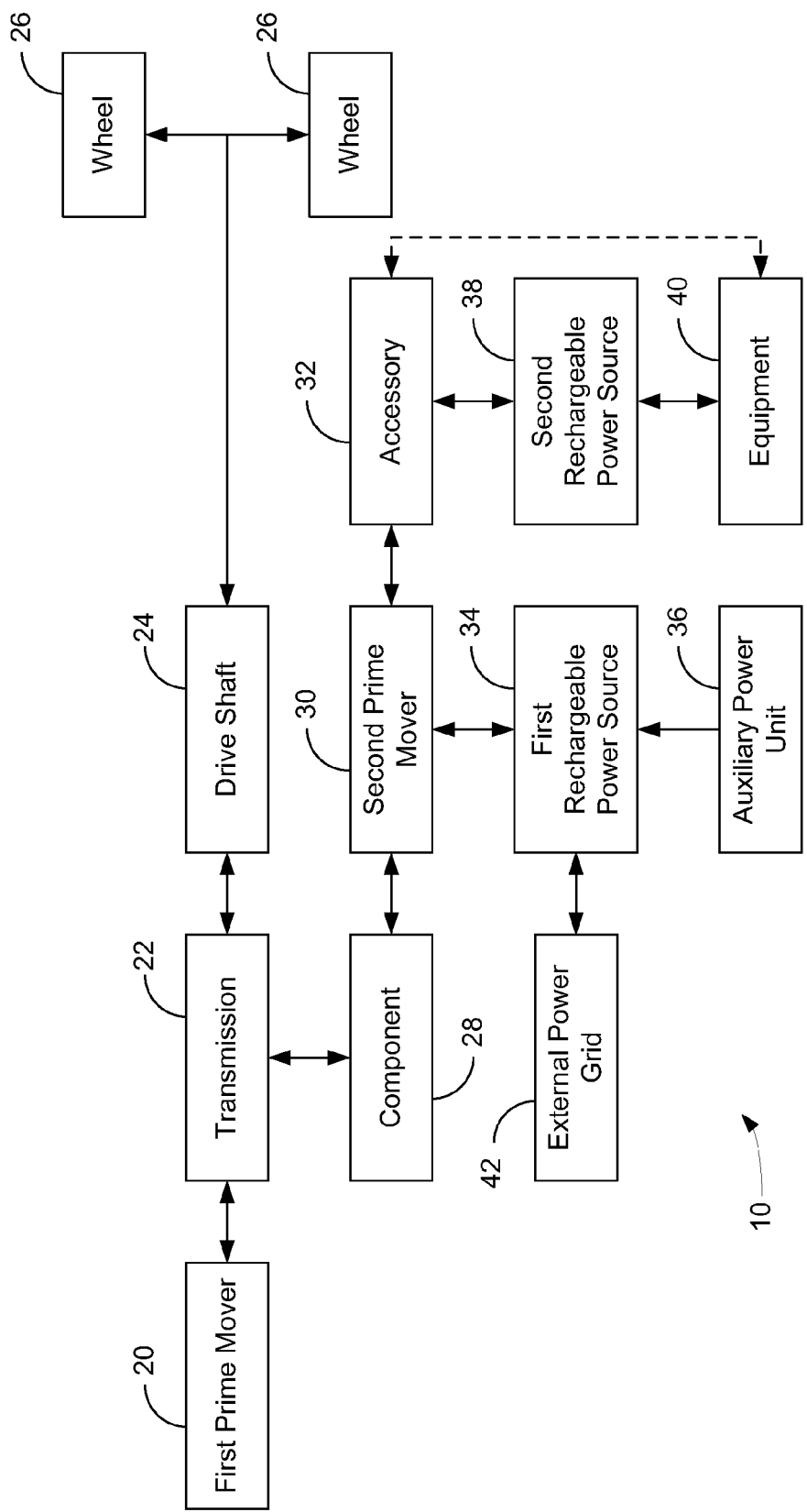
FIG. 2 is a schematic block diagram of a hybrid vehicle system for use with the system illustrated in FIG. 1, in accordance with an exemplary embodiment of the disclosure.

Referring to FIG. 1-2, vehicle drive system and an accompanying control system for a vehicle 10 is shown schematically according to an exemplary embodiment. The vehicle 10 is a hybrid vehicle that is propelled by a hybrid vehicle drive system 12. Vehicle 10 can be a hybrid vehicle as disclosed in U.S. patent application Ser. No. 12/710,247 or any of the applications incorporated herein by reference.

A control system 14 is preferably provided on vehicle 10 to optimize the operation of vehicle drive system 12. Control system 14 can advantageously optimize fuel consumption by vehicle 10 and/or consumption of energy stored on-board vehicle 10 for use at a job site and along transportation routes. Control system 14 can be comprised of a processor, memory and communication ports for receiving data and providing commands to subsystems of vehicle 10. According to one exemplary embodiment, control system 14 may receive data from on-board components and systems, such as a GPS receiver or unit 15 and an internal database 16. Other on-board components such as an accelerometer, a yaw sensor, a barometric altimeter, a temperature sensor, a tire pressure sensor, a suspension load sensor, a J1939 data transmitter, a cellular radio or wifi location input or sensor, or other on-board components or inputs may make data available to control system 14. GPS receiver 15 may be separate from control system 14, or may be integrated with control system 14. GPS receiver 15 may have the ability to receive and transmit data. Data may be sent and/or received by a variety of means, including but not limited to wireless connection (wifi, Bluetooth, cellular, satellite, radio, IR, etc.) or via a conductor, such as a plug-in charging cord, or some other means. The plug-in charge cord used with plug-in hybrid systems or electric vehicles, sometimes referred to as the Electric Vehicle Supply Equipment (EVSE), may incorporate a variety of means to send data, including but not limited to a dedicated conductor to convey a signal, a fiber optic cable or an incorporated power line carrier (PLC). The EVSE may also transmit and/or receive data to vehicle control system 14 via wireless signal, and may receive data from and/or transmit data to the grid (part of smart grid system) via a wireless signal or other means such as PLC.

Components on vehicle 10 may exchange data via wired connection, such as CAN bus, or via wireless connection such as Bluetooth, wifi, ZigBee, or other means. Optionally, a device may be used to receive and/or transmit data from one source, such as a cellular, wifi or other wireless source and transmit and/or receive the data via another means to control system 14. The device may be a cellular phone, smart phone, or embedded transceiver. The data may be transmitted and/or received from the device to control system 14 via a variety of means including but not limited to wired connection, IR, fiber optic, wireless (wifi, Bluetooth, ZigBee, etc.).

According to other exemplary embodiments, control system 14 may receive data or instructions from an external source. Vehicle 10 may be part of a fleet of vehicles. Control system 14 may serve as an on-board fleet management system in communication with a central fleet control system 17 with a database 18. Control system 14 may connect directly to fleet control system 17 and external database 18 (e.g., via a wired connection or via a wireless connection), or may connect to fleet control system 17 via another component, such as an external modem 19. In one embodiment, a lap top computer, a hand held computer, a smart phone, or other communication device can communicate with control system 14 and provide data to fleet control system 17.

In an embodiment using a smart phone, an app or program can be provided for communicating with control system 14. In one embodiment, smart phone executing the app can be independent of or communicate with fleet control system 17 and provide the storage, processing, and command functions associated with system 17. The smart phone, or other wireless device, may also communicate with a smart grid system and/or or fleet control system 17.

Referring now to FIG. 2, a hybrid vehicle drive system 12 is shown according to an exemplary embodiment. Hybrid vehicle drive system 12 can be employed on any type of vehicle. According to one embodiment, vehicle 10 can be any type of light, medium, or heavy duty truck. In one preferred embodiment, vehicle 10 is a truck that employs hydraulic systems such as a boom truck. Alternatively, the vehicle can be any type of platform where hybrid systems are employed. Vehicle 10 may have a wide variety of axle configurations including, but not limited to a 4×2, 4×4, or 6×6 configurations, or use tracks. Vehicle 10 may be used on a road and/or off road.

In one preferred embodiment, vehicle 10 is a truck such as an International 4300 SBA 4×2 truck. The vehicle includes a hydraulic boom. According to an exemplary embodiment, the vehicle may further include a hydraulic platform rotator, a hydraulic articulating jib and winch (e.g., with a capacity of 1000 lbs.), a hydraulic jib extension, hydraulic tool outlets, an on-board power charger providing 3 and/or 6 and/or 10 kW at 240 VAC, and electric air conditioning.

In another embodiment, vehicle 10 includes a hydraulically-operated underdeck air compressor. The compressor may utilize a compressed air storage tank to monitor the demand for air. According to an exemplary embodiment, vehicle 10 may further include air hose reels, air tool outlets, hydraulic tool outlets, an on-board power charger providing up to 8 kW at 240 VAC, and electric air conditioning. The above referenced power, air compressor, and types of components are exemplary only.

System 12 includes a first prime mover 20 (e.g., an internal combustion engine, such as a diesel fueled engine, etc.), a first prime mover driven transmission 22, a component 28 (e.g., a power take-off (PTO), a transfer case, etc.), a second prime mover 30 (e.g., a motor, such as an electric motor/generator, a hydraulic pump with a thru-shaft, a compressor, pneumatic blower, vacuum pump, liquid transfer pump, etc.), and an accessory 32 (e.g., a hydraulic pump, such as a variable volume displacement pump, etc.). In certain embodiments, accessory 32 can act as a third prime mover. Transmission 22 is mechanically coupled to component 28. Component 28 is coupled to second prime mover 30. Second prime mover 30 is coupled to accessory 32.

In one embodiment, component 28 is a PTO that can be engaged or disengaged from transmission 22. Transmission 22 may be a manual transmission, automated manual transmission, automatic transmission, or another type of transmission. A clutch mechanism can be employed to properly engage and disengage component 28 and transmission 22.

The nature and arrangement of accessory 32 and second prime mover 30 relative to each other may be changed in various exemplary embodiments. Second prime mover 30 is shown in FIG. 2 as an electric motor which is coupled between component 28 and accessory 32 (e.g., the electric motor includes a thru-shaft that is coupled to the PTO and the hydraulic pump). However, in one exemplary embodiment, accessory 32 is embodied as a hydraulic motor and includes a thru-shaft coupled to component 28 embodied as a PTO. The through shaft is then also coupled to the shaft of the second mover 30 embodied as an electric motor.

According to one embodiment, system 12 also includes a first rechargeable energy source 34 (e.g., a battery, a bank of batteries, a fuel cell, a capacitive cell, or other energy storage device), an Auxiliary Power Unit (APU) 36 (e.g., an internal combustion engine, possibly fueled by an alternative low emission fuel (e.g., bio-mass, natural gas, hydrogen, or some other fuel with low emissions and low carbon output), and a generator, a fuel cell, etc.), a second rechargeable energy source 38 (e.g. a hydraulic accumulator, ultra capacitor, pneumatic accumulator (compressed gas storage tank), etc.), and onboard or external equipment 40 (e.g., hydraulically operated equipment, such as an aerial bucket, pneumatically operated equipment, such as pavement breakers, etc.).

First rechargeable energy source 34 is coupled to second prime mover 30 and provides power for the operation of second prime mover 30. First rechargeable (e.g., pressurized or rechargeable) energy source 34 may include other auxiliary components (e.g., an inverter provided for an AC motor, a DC-to-DC converter to charge a DC system, an inverter for power exportation to a power grid or other equipment, controllers for motors, a charger, etc). Exportable power may be supplied by the inverter using power from first rechargeable energy source 34, or from the vehicle chassis energy source (such as a 12V battery, which is replenished from first rechargeable energy source 34 using a DC to DC converter), or by some other means. APU 36 is coupled to first rechargeable energy source 34 and provides power to first rechargeable energy source 34.

According to one exemplary embodiment, second renewable energy source 38 is a hydraulic system with a high pressure portion (e.g., an accumulator) and a low pressure component (e.g., a reservoir tank). According to another exemplary embodiment, accessory 32 may be a compressor and second renewable energy source 38 may be a compressed gas storage tank. Second rechargeable energy source 38 is coupled to accessory 32 and provides stored power for accessory 32. Onboard or external equipment 40 can be coupled to accessory 32 or second rechargeable energy source 38 and operate using power from either accessory 32 or second rechargeable energy source 38. In one embodiment, onboard or external equipment 40 is coupled through second rechargeable energy source 38 to accessory 32.

In one embodiment, second rechargeable energy source 38 is utilized, and provides power to accessory 32. Additional or alternative power can be provided to drive shaft 32 by accessory 32. For example, accessory 32 can provide power to drive shaft 24 until second rechargeable energy source 38 is discharged. Alternatively, accessory 32 can provide additional power to drive shaft 24 during vehicle acceleration. Accessory 32 provides power to drive shaft 24 through second prime mover 30, component 28, and transmission 22. In one embodiment, energy from equipment 40 can be recovered in source 38 or accessory 32. For example, when a boom is lowered, power can be provided from the boom to the hydraulic system.

While component 28 is engaged, second prime mover 30 can operate to provide power to a drive shaft 24 via transmission 22. Second prime mover 30 may be further used to power various on-board components such as compressors, water pumps, cement mixer drums, etc.

An external power grid 42 allows first rechargeable energy source 34 to be recharged with a cleaner, lower cost power compared to recharging first rechargeable energy source 34 with first prime mover 20. Power from an external power grid may be provided at a fraction of the cost of power provided from an internal combustion engine using diesel fuel. According to one exemplary embodiment, first rechargeable energy source 34 can be recharged from an external power grid 42 in approximately 8 hours or less. Generally, external grid energy or power can be available at a home base, a job site or a depot for vehicle 10

For explanatory purposes, hybrid vehicle drive system 12 is described below as utilizing a first rechargeable energy source 34 embodied as a battery or ultracapacitor to store electric power and a second rechargeable energy source 38 embodied as a hydraulic or pneumatic tank to store power in the form of hydraulic or pneumatic pressure. It should be understood that in other exemplary embodiments, hybrid vehicle system 12 may utilize a first rechargeable energy source 34 that is a hydraulic system, a pneumatic system, or a combination of electric, hydraulic, or pneumatic systems, or a second rechargeable energy source 38 embodied as a battery or ultracapacitor to store electric power.

Hybrid vehicle drive system 12 generally operates in three modes. The three modes can be entered in response commands from control system 14 or fleet control system 17. In a first or charge deplete mode, second prime mover 30 consumes power from first rechargeable energy source 34. First prime mover 20 provides power to drive shaft 24 through transmission 22 to drive wheels 26. Second prime mover 30 provides additional or alternative power to drive shaft 24 through component 28 and transmission 22. Drive shaft 24 provides power to two or more wheels 26 used to provide forward and backward momentum to the vehicle. For example, second prime mover 30 can optionally provide the sole source of power to drive shaft 24. Alternatively, second prime mover 30 can provide additional power to drive shaft 24 during vehicle acceleration. Second prime mover 30 may also be utilized to operate devices when vehicle 10 is stationary or when vehicle 10 is in transit. For example, second prime mover 30 may operate an accessory 32 such as a hydraulic pump. Accessory 32 may then be utilized to operate on-board equipment 40 such as a hydraulic boom. Alternatively, second prime mover 30 may be utilized to provide AC or DC power to other electric devices (e.g., an air conditioner, fans, lights, radio, handheld electronics, etc.). The charge deplete mode can be commanded when stored energy is greater than the energy required for the job site or when vehicle 10 is traveling back to a home base or job site with a charging station. The charge deplete mode may also be used during transit when a control system 14 or 17 commands second prime mover 30 to draw more energy from rechargeable energy source 34 than is replaced by regenerative braking, use of second prime mover 30 as a generator powered by prime mover 20, or other means. Control system 14 may command the charge deplete mode in response to a duty cycle in which additional power during driving is more important than displacement of less efficient operation at a job site by use of an idling engine rather than use of stored energy from first rechargeable energy source 34. Control system 14 or 17 may command the use of additional power during transit for emergency vehicles traveling to an accident, defense vehicles during combat operations, or other applications. Control system 14 or 17 may also use a charge deplete mode for transit if the use of supplemental energy from first rechargeable energy source 34 improves efficiency more than the use of the energy from first rechargeable energy source 34 for other portions of the duty cycle, such as if a work truck does not operate at a job site. Vehicle operations in the stationary mode at a job site tend to be a less efficient use of fuel due to excess power generated during the idling of first prime mover 20 in order to operate small accessory loads, and the frequent need to idle the first prime mover 20 continuously even if accessory loads, such as a hydraulic pump, tend to be intermittent. As will be shown, various methods can be used to determine the most appropriate use of energy from first rechargeable energy source 34.

In a second or charge accumulate mode, second prime mover 30 is operated as a generator to generate electric power to be stored in first rechargeable energy source 34. According to the various exemplary embodiments of system 12, first rechargeable energy source 34 can be charged or powered by second prime mover 30, APU 36 or another suitable source (e.g., the vehicle alternator, the power grid, etc.). For example, first rechargeable energy source 34 may be plugged into external grid 42 when vehicle 10 is stationary, such as when parked overnight. In one embodiment, a user can select between 220-240V recharging, 110-120V recharging, and no external energy source available for recharging. For the different voltages, the amount of power that can be replenished over a certain period of time (e.g., when connected to an external power grid overnight) could be calculated. Beyond that amount of power usage, first prime mover 20, or APU 36 is engaged to charge or provide power to first rechargeable energy source 34. If no external energy source is available, first prime mover 20 or APU 36 can be automatically engaged during regular finite periods, calculated to minimize idle time. The charge accumulate mode can be commanded when stored energy is less than the energy required for the job site. The charge accumulate mode can be exited if sources 34 and/or 38 reach maximum storage levels. Control system 14 or 17 can command the previously described operation if it is more efficient to charge second rechargeable energy source 38 to supply energy for operations at the jobsite rather than using prime mover 30 at the job site. Control system 14 or 17 may also factor in other priorities, such as the need to operate quietly while vehicle 10 is stationary rather than running prime mover 20. Quiet, low emission operation at the job site using energy from first rechargeable energy source 34 may be especially important during stationary use of vehicle 10 in a city, in an enclosed space such as a tunnel, at night in an urban area or other circumstances that place a high priority on minimizing the use of the prime mover 20 at a job site. Control system 14 or 17 can also command hybrid vehicle drive system 12 to be in a charge accumulate mode in response to an input from a smart grid signal to vehicle 10 via a wireless signal (cellular, wifi, radio, etc.) or other means of communicating with vehicle or driver. The smart grid signal may provide an input that control system 14 receives which places a priority on maintaining a high state of charge level, such as if vehicle 10 will be connected to the grid (V2G) and the energy is needed to flow from vehicle 10 to the grid to supplement the grid or other demands for power from buildings, equipment, or other loads. Additional smart grid commands and communications between other hybrid vehicles or energy storage devices may occur using wireless signals (cellular, 4G LTE, wifi, GSM, SMS or other) and received, interpreted and processed by the on vehicle control system, or cloud based control system that use vehicle control system in master/slave arrangement. Vehicle control system 14 or fleet control system 17 may then communicate with other machines to coordinate the optimal storage, use and delivery of power (machine to machine, or m2m) or communicate other messages to enhance vehicle efficiency for a fleet of vehicles or complete other activities. When vehicle 10 is connected to the grid via an Electric Vehicle Supply Equipment (EVSE) or other means, wired communications between the control system and other devices may optionally be used.

In a third or charge sustain mode, one or more devices in hybrid vehicle drive system 12 are activated intermittently to maintain a predetermined charge in first rechargeable energy source 34, or to operate within a range of an upper and lower limit state of charge so that the average state of charge over a longer period of time remains the same. In one embodiment, system 12 is configured to automatically engage APU 36 or first prime mover 20 through component 28 or accessory 32 to charge first rechargeable energy source 34 when the stored energy decreases to a certain amount. The permissible reduction in stored energy can be determined based upon levels estimated by control system 14 and/or fleet control system 17. Further, as the charge in first rechargeable energy source 34 approaches the predetermined threshold, hybrid vehicle drive system 12 may be operated differently to avoid consuming power from first rechargeable energy source 34. For example, second prime mover 30 may not be used to assist with positive acceleration of vehicle 10 when hybrid vehicle drive system is in a charge sustain mode, or second prime mover 30 may be operated with reduced power. However, second prime mover 30 may still be operated as a generator to recapture energy, such as with regenerative braking. The charge sustain mode can be commanded when stored energy is at the energy required for the job site. If sources 34 and/or 38 have reached maximum storage levels (e.g., due to charging at a charging station or due to operation in the charge accumulation mode), the charge sustain mode can be commanded by system 14. Control system 14 can implement hysteresis to reduce on/off cycling.

Control system 14 can continually monitor sources 34 and 38 and energy requirements along the route and at the job sites to make commands for the appropriate mode of operation. If energy requirements along the route or at the job site are more or less than predicted, control system 14 can appropriately change the mode of operation.

Control system 14 may also allow vehicle 10 to operate in a regular hybrid operational mode where vehicle 10 operates according to conventional hybrid algorithms. Such a mode may be implemented rather than a charge sustain mode.

Figure 3:
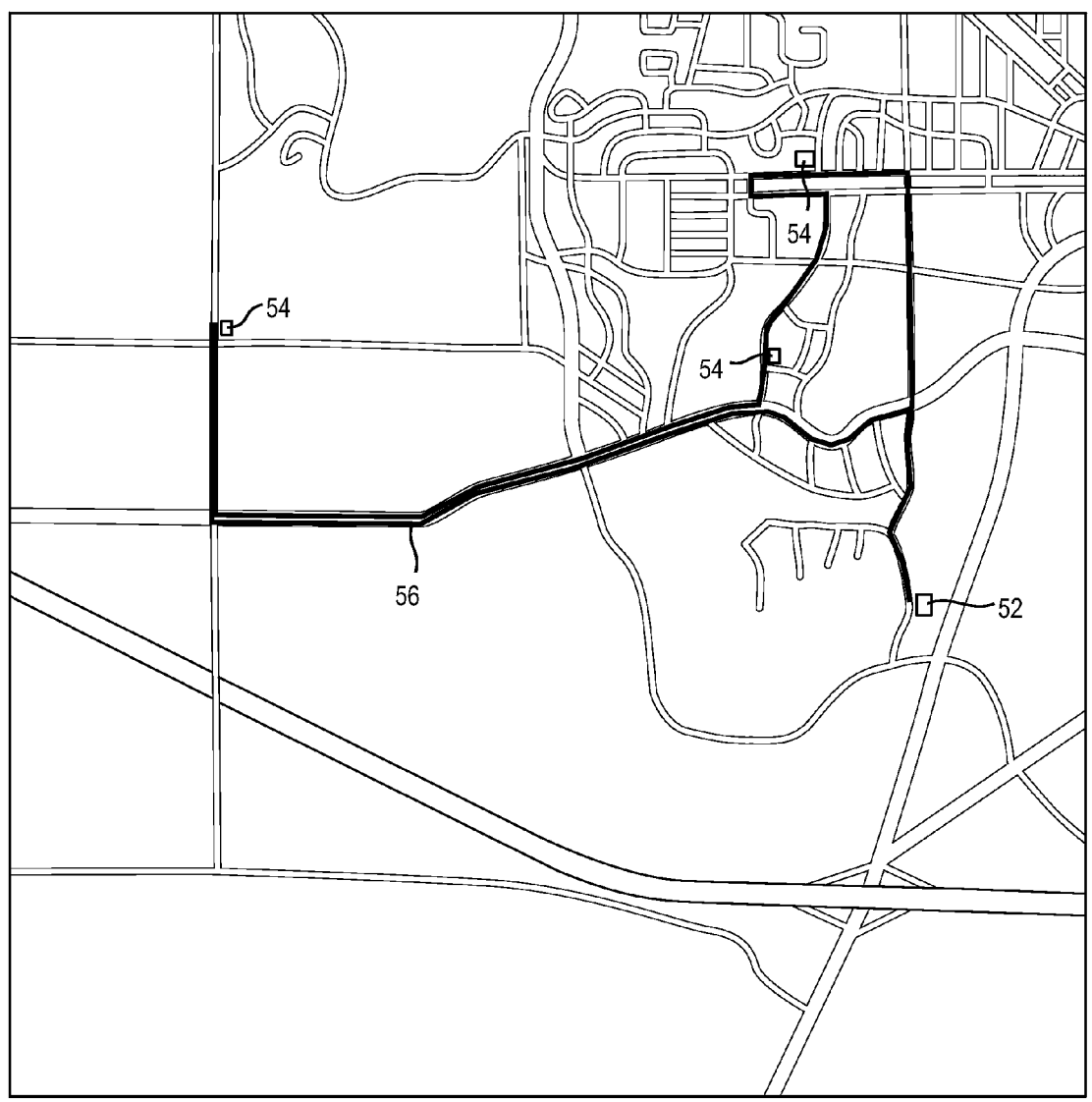
FIG. 3 is a schematic representation of an optimized route between a starting point and multiple job sites for a hybrid vehicle, in accordance with an exemplary embodiment of the disclosure.

Referring now to FIG. 3, vehicle 10 may be a utility vehicle that is housed at a home location (e.g., a garage, headquarters, base, etc.) 52. Vehicle 10 may be plugged into external power grid 42 at home location 52. Hybrid vehicle drive system 12 is in a charge accumulate mode to recharge first rechargeable energy source 34. In typical operation, vehicle 10 departs from home location 52 to one or more remote job sites 54 before returning back to home location 52. The power stored in first rechargeable energy source 34 may be utilized to operate devices such as accessory 32 and/or on-board equipment 40 at job sites 54 in addition to providing power to drive wheels 26 to propel vehicle 10 during transit along a route 56. However, it may be desirable to provide power when vehicle 10 is stationary at job sites 54 in a idle-free mode (e.g., with first prime mover 20 turned off). Operating vehicle 10 in an idle-free mode may be necessary to comply with local or state ordinances and reduces the amount of noise and emissions produced by vehicle 10. Therefore, providing power to accessory 32 and/or equipment 40 may be prioritized over providing propulsion power to wheels 26. Before departing home location 52, the estimated power usage for vehicle 10, both in transit along route 56 between home location 52 and job site(s) 54 and the power usage at job site(s) 54. The operation of vehicle drive system 12 may therefore be optimized to maintain sufficient power levels in first rechargeable energy source 34 for the expected power usage at job site(s) 54. The optimization may involve switching hybrid vehicle drive system 12 between charge deplete and charge sustain modes.

An optimized route between a home location 52 and one or more job sites 54 in an area 50 is shown in FIG. 3 according to an exemplary embodiment. The locations of the job sites 54 to be visited by vehicle 10 are determined either manually or may be determined automatically by control system 14 and/or fleet control system 17. If vehicle 10 is part of a fleet of vehicles, the job sites 54 visited by each vehicle 10 may be determined by a number of criteria, including job type, job urgency, and job site location.

An optimized route 56 is then set for a vehicle to take between home location 52 and job sites 54. Different criteria may be used to initially plot a route, including traffic patterns, topography, traffic density, etc. Route 56 may be optimized, for example, to minimize transit time, to minimize fuel usage, to maximize energy returns from regenerative braking, etc. The net gain or loss of energy for first rechargeable energy source 34 and the relative efficiency of hybrid vehicle drive system 12 during transit along route 56 may be estimated using a wide variety of criteria, including, but not limited to vehicle weight or mass; total vehicle travel distance; fuel economy, brake use; cruise control use; and torque, rotational speed, temperatures, and operational times of various devices in hybrid vehicle drive system 12. As will be described in more detail below, data from vehicle 10 in transit along route 56 may be collected in a database to refine the energy usage estimates and route optimization for future vehicles.

Once the identity and locations of job sites 54 for a vehicle 10 are determined, and an optimized route 56 to the job sites 54 is determined, an estimated power usage for the job sites 54 may be estimated. Initially, the power usage for the job sites may be estimated by the driver or the fleet manager based on such criteria as the expected length of the job and the types of tasks to be completed at the job site. Optionally, system 14 may make automatic estimates of power usage at job sites, or assist personnel in selection of the power estimate based on the type of equipment on vehicle 10 that is often used at a job site, use averages based upon previous events, or may use estimates based upon additional criteria such as the type and number of other vehicles nearby, the locations of the job site, season (e.g. winter, summer, etc.), the day and/or time of day, typical number of boom movements, or type and/or density of soil if equipment is used to dig or drill a hole in the ground. The net gain or loss of energy for first rechargeable energy source 34 and the relative efficiency of hybrid vehicle drive system 12 during operation at job sites 54 and/or driving may be estimated using a wide variety of criteria, including, but not limited to fuel economy; accelerator pedal position; torque, rotational speed, temperatures, and operational times of various devices in hybrid vehicle drive system 12; first rechargeable energy source 34 voltage or charge; and activity of on-board devices such as air conditioner activity, ePTO activity; heater activity, charger activity, etc. As will be described in more detail below, data from vehicle 10 at each job site 54 may be collected in a database to refine the energy usage estimates.

Control system 14 and/or fleet control system 17 may operate hybrid vehicle drive system 12 (e.g., in charge deplete, charge accumulate, and charge sustain modes) to optimize the energy utilization of vehicle 10 and return to home location 52 with a minimum of energy stored in rechargeable energy source 34. For example, a route 56 for a vehicle 10 may include predominantly dense city driving (i.e. with multiple expected starts and stops) to a multitude of job sites 54 with little time spent at each job site 54. In such a scenario, the estimated job site energy usage may be relatively low and hybrid vehicle drive system 12 may be operated in a charge deplete mode when in transit along route 56 to consume energy from first rechargeable energy source 34. Control system 14 and/or fleet control system 17 is not limited to operation of system 12 and may operate other hybrid vehicle drive systems in which the hybrid system can store energy in a rechargeable energy storage system, where power from the rechargeable energy system maybe varied to improve overall efficiency of the vehicle for various duty cycles. In another embodiment, hybrid system 12 may only be capable of recharging the rechargeable energy source 34 during the driving mode and/or at the job site, through an alternator, through regenerative braking, through diversion of some of the power from prime mover 20 to a second prime mover 30 which acts as a generator or through some other means. Control system 14 and/or fleet control system 17 may affect operation of system 12 so as to optimize overall energy efficiency by selecting the most efficient method to recharge the battery system (e.g., source 34) based upon various input criteria, such as, but not limited to activation of second prime mover 30 as a generator during highway driving when prime mover 20 is operating at a more efficient rpm or power range. Systems 14 and 17 may then use the energy in rechargeable energy system 34 to eliminate the need for operation of the prime mover 20 in less efficient modes of operation such as low speed idle movement of the vehicle, idle of engine when vehicle 10 is stationary, inefficient use of a heat engine to power equipment and other loads on vehicle 10, or other scenarios when prime mover 20 is not the most efficient source of power. While the prime mover 20 is off, rechargeable energy source 34 is used to provide power for needed functions on vehicle 10, resulting in reduced overall fuel consumption, lower overall harmful emissions, reduced noise during operation of vehicle 10 and other benefits.

Energy optimization for hybrid vehicle drive system 12 may comprise minimizing idling of first prime mover 20 to provide energy to auxiliary components when vehicle 10 is stationary, such as at a job site 54. To reduce idling time of first prime mover 20, control system 14 and/or fleet control system 17 may operate hybrid vehicle drive system 12 to reserve energy stored in first rechargeable energy source 34 for use at job sites 54 and limit the operation of hybrid vehicle drive system 12 in a charge deplete mode when in transit along route 56.

According to another embodiment, control system 14 can provide energy storage information indicating the amount of energy remaining in rechargeable energy sources 34 and 38 and provide the energy storage information to fleet control system 17. Fleet control system 17 can select vehicle 10 or other vehicles in the fleet for the next job based upon the energy storage information. Sensors on board vehicle 10 can sense the energy in sources 34 and 38 via voltage parameters, pressure parameters, etc and provide such parameters to system 14. Fleet control system 17 can select one vehicle with greater energy stored in sources 34 and 38 for the next job site if both vehicles are a similar distance to the next job site. Further, system 17 could choose the vehicle with less energy stored if the next job site includes a fueling station or access to the electrical grid for sources 34 and 38. Preferably, system 17 has access to data about each job site. Such data can include its location, length of time for types of job at the job site, energy usage for types of jobs at the job site, whether a fueling station is available at the job site, power from electric grid available at the job site, etc.

Figure 6:
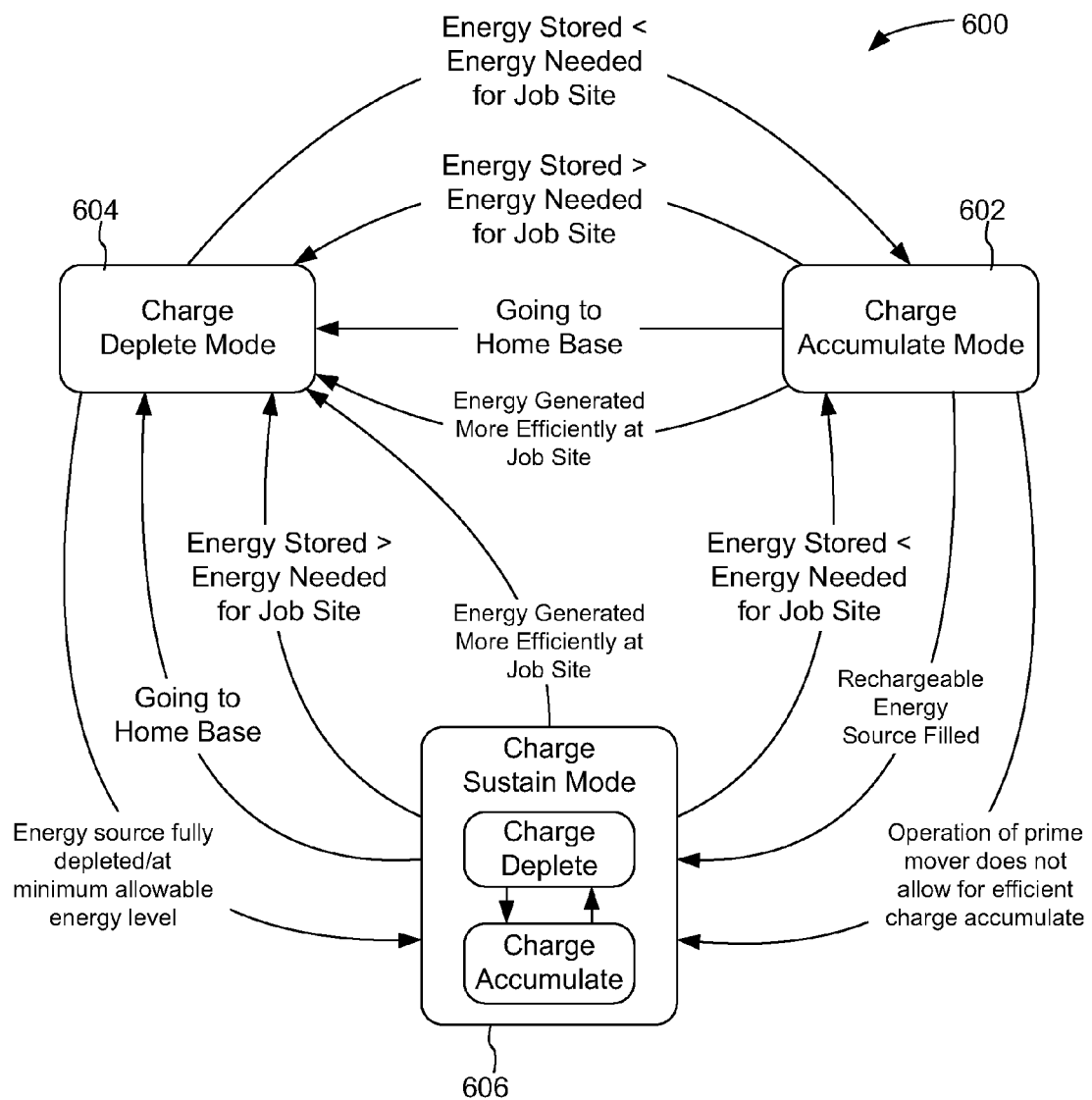
FIG. 6 is a simplified state diagram showing exemplary operation of the energy optimization system illustrated in FIG. 1.

With reference to FIG. 6. a simplified state diagram 600 shows an exemplary embodiment of the operation of system 10 and transitions between an energy or charge accumulate mode 602, an energy or charge depletion mode 604, and an energy or charge sustain mode 606 in response to stored energy levels and predicted energy use. State diagram 600 is exemplary only. Additional or different criteria can be considered for transitioning between modes 602, 604, and 606 without departing from the scope of the invention.

Charge sustain mode 606 can include a charge accumulate sub-mode 607 and a charge deplete sub-mode 609, for use during vehicle transport. In one embodiment, charge sustain mode 606 may include a separate charge and deplete mode or sub-modes which are chosen as a vehicle 10 travels across various portions of the route. In another embodiment, sustain mode 606 can use modes 604 and 602 to optimize fuel consumption and energy storage during charge sustain mode 606.

According to one embodiment, charge sustain mode 606 can alternate between a charge accumulate sub-mode 607 and a charge deplete sub-mode 609 to maintain an energy level in power sources 34 or 38 over a time period. For example, charge accumulate sub-mode 607 can be reached prior to a base of a hill and a charge deplete sub-mode 609 can be entered while the vehicle travels up the hill. Once the crest of the hill is reached, charge accumulate sub-mode 607 can be reinstated. A route map can be used by control system 14 or fleet control system 17 to implement the appropriate sub-modes. The route map can include elevation data or be based upon empirical data. Empirical data can be collected by system 14 and system 17 of RPM loads across the work route. In addition, systems 14 and 17 can utilize vehicle weight data to choose sub-modes 607 and 609. According to one embodiment, primary mover 20 can be operated at its most efficient constant RPM as the vehicle 10 travels up and down hills at preferred speeds along the route. The charge accumulate sub-mode 607 is used when higher engine output is not required, and charge depletion sub-mode 609 when higher than optimal output is needed from prime mover 20.

In one embodiment, system 10 may change from charge deplete mode 604 to charge sustain mode 606 or the charge accumulate mode 602 if rechargeable energy source 34 is fully depleted or reaches the minimum allowable level of energy (e.g., a low battery state of charge). Further, system 10 may change from charge accumulate mode 602 to charge sustain mode 606 if prime mover 20 cannot be operated to efficiently store energy in the rechargeable source 34 (e.g. the vehicle is going up hill, the vehicle needs all power for motive power, or prime mover 20 is operating at an inefficient rpm). An algorithm determines if it is more efficient to operate in a charge accumulate mode 602 or in a charge sustain mode 606 once the rechargeable source 34 has been fully depleted or reaches minimum level of energy.

In one embodiment, diagram 600 can also include a stop mode in which the idle is bumped to achieve more efficient operation of vehicle 10. In such an embodiment, when vehicle 10 is stopped, power from second prime mover 30 or accessory 32 increases the RPMs associated with the motor (mover 20). Such an increase in the RPM of prime mover 20 results in a reduction in fuel being provided by the electronic control module (ECM) of vehicle 10. The increased RPM is preferably controlled to be below a threshold so that transmission 32 does not begin normal forward operation in response to the increased RPM. In such a configuration, system 10 advantageously reduces engine idle fuel consumption without requiring significant changes to vehicle 10. Bumping the idle provides an advantageous way of reducing energy consumption by prime mover 20 when vehicle 10 is stopped. Once the vehicle accelerator is depressed, the ECM provides fuel to prime mover 20 or prime mover 30 or accessory 32 provides power to transmission 22 so that vehicle 10 operates according to normal operation. The ECM can also reduce fuel consumption during travel when prime mover 30 provides power during travel and prime mover 20 is also engaged.

Figure 9:
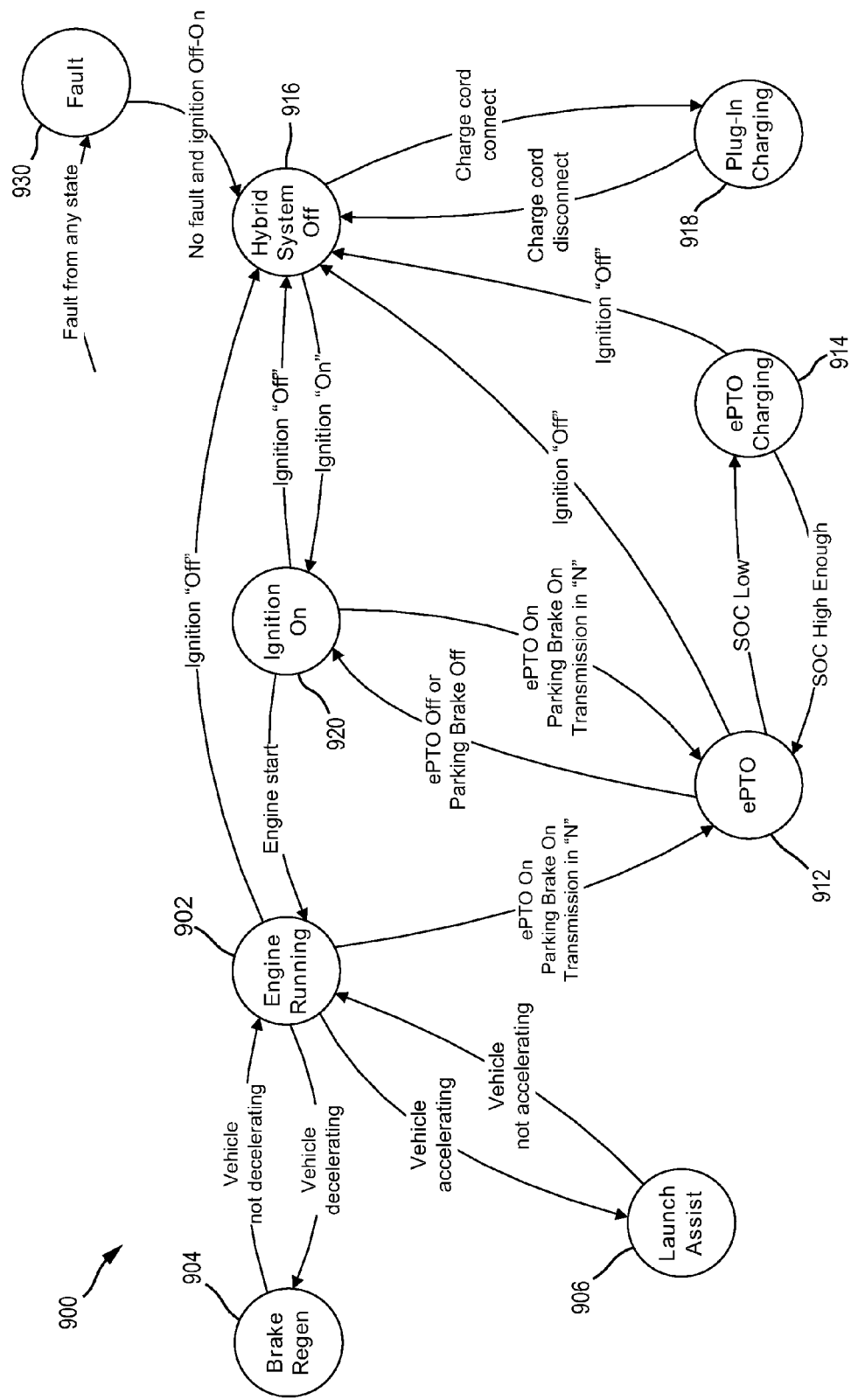
FIG. 9 is a simplified state diagram showing exemplary operation of the energy optimization system illustrated in FIG. 1.

With reference to FIG. 9. a simplified state diagram 900 shows an exemplary embodiment of the operation of system 10 and transitions between an engine running mode 902, a brake regeneration mode 904, and a launch assist mode 906 in response to vehicle acceleration and deceleration. State diagram 900 is exemplary only. Additional or different criteria can be considered for transitioning between modes 902, 904, and 906 without departing from the scope of the invention.

Diagram 900 also includes an ePTO mode 912, an ePTO charging mode 914. Mode 912 is entered from an ignition on mode 920 when electronic use of the PTO is desired. The ePTO mode 912 can be entered when the parking brake is on and transmission 22 is in neutral. Mode 920 can be entered from mode 912 when the parking brake is off or transmission is moved from neutral or if the ePTO mode is deselected. System 10 can alternate from modes 912 and 914 based upon the state of charge. Hybrid system off mode 916 can be entered from a plug-in charging mode 918 when the charge cord is disconnected. Mode 918 can be entered when the charge cord is connected. Mode 902 is entered from mode 920 when the engine is started. A fault mode 930 from any state can be entered. An operator can select ePTO mode 912 via a user interface.

Figure 4:
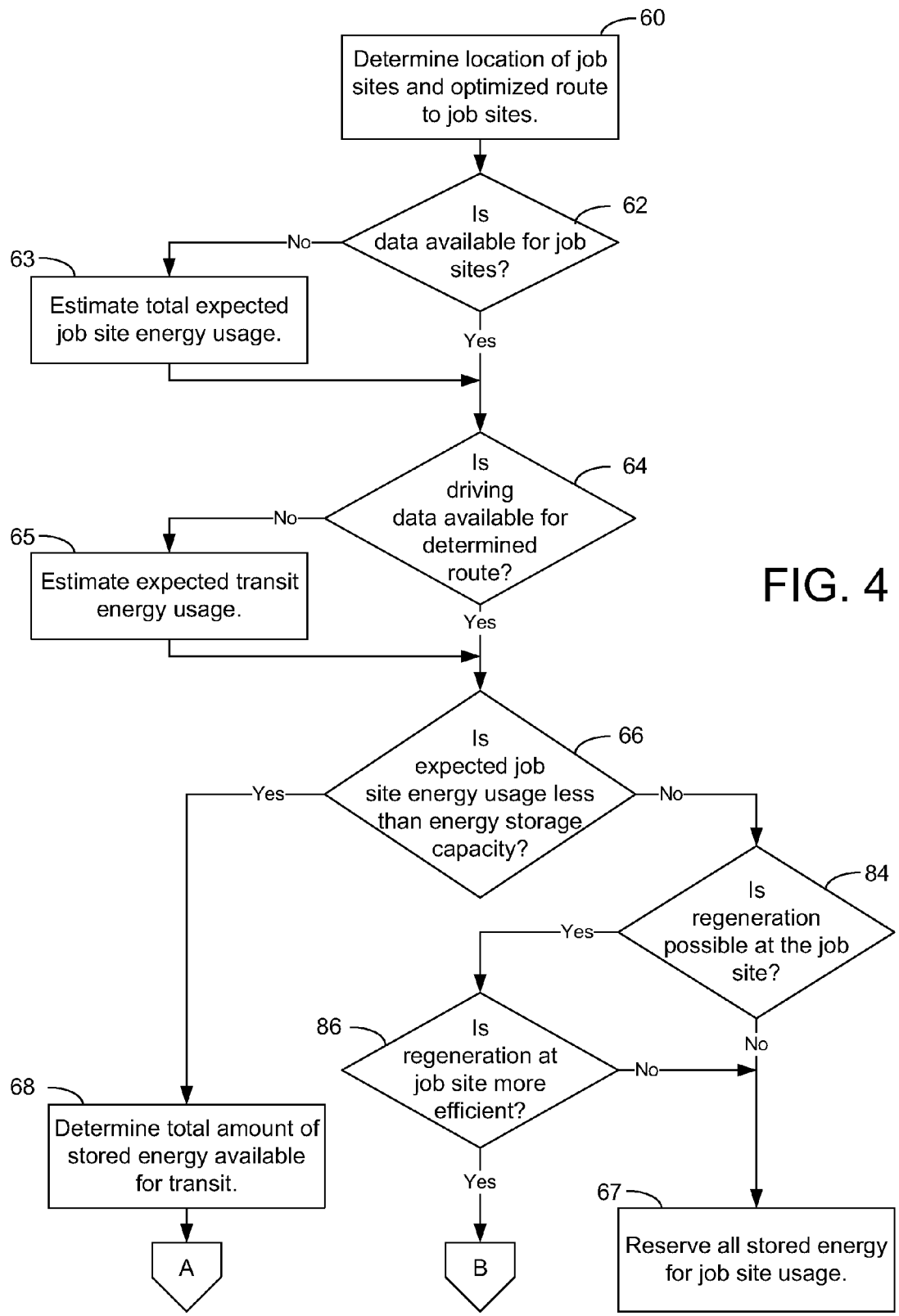
FIGS. 4 and 5 are a flowchart of an exemplary method for determining an optimized route to a job site and an expected power usage for the job site and operating the system illustrated in FIG. 1 according to the optimized route and expected power usage, in accordance with an exemplary embodiment of the disclosure.
Figure 5:
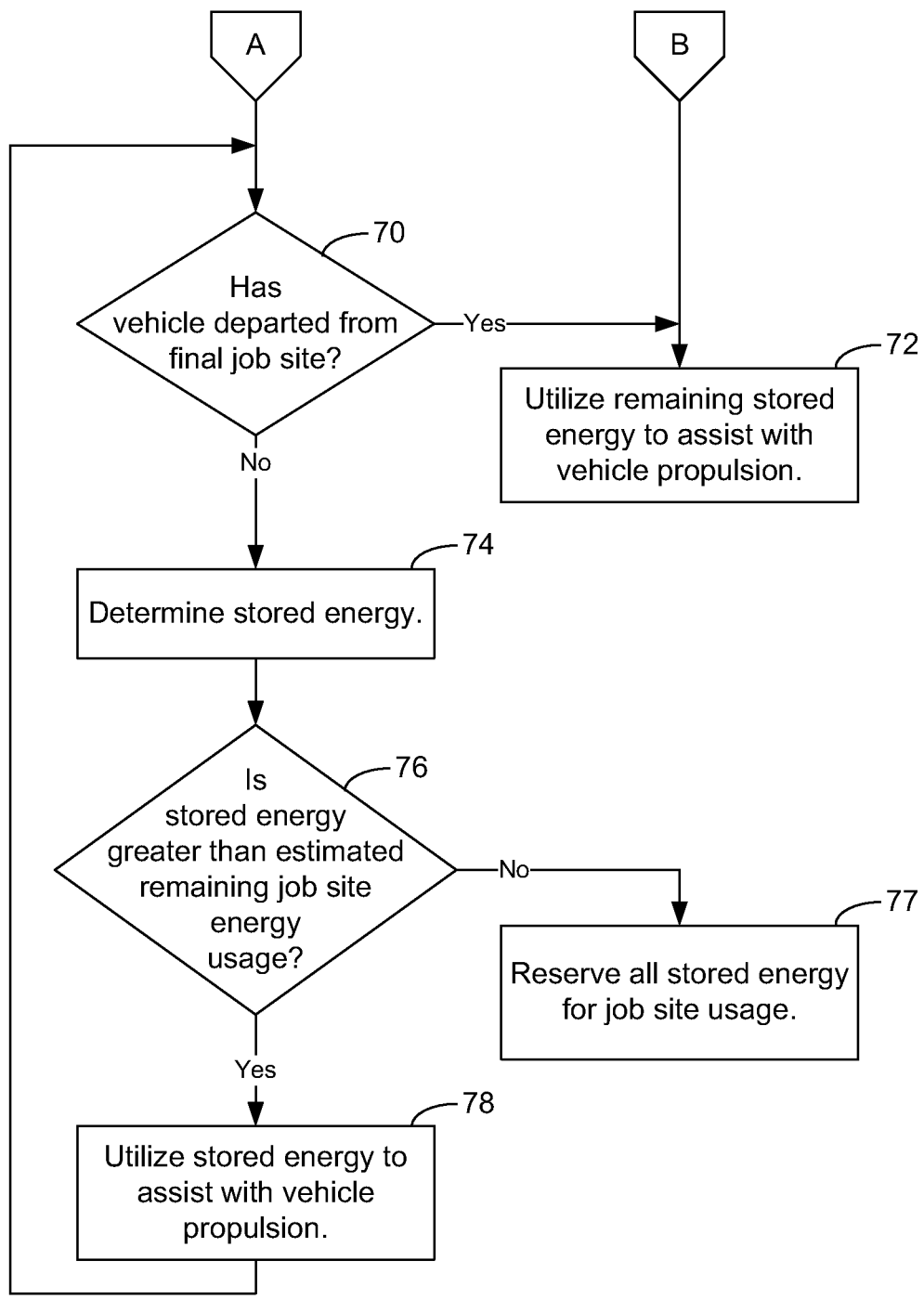

Referring to FIGS. 4-5, a method estimates vehicle energy usage for job sites 54 and transit along an optimized route 56 to and from job sites 54. The location of job sites 54 and an optimized route 56 to and from job sites 54 is first determined (step 60). The available data for the expected job sites 54 is analyzed (step 62). If historical data is available for the job sites (e.g., historical data stored in internal database 16 and/or external database 18), it is used to estimate the total expected job site energy usage. If no historical data is available, the total expected job site usage is estimated using available data, such as the type and expected duration of job(s) (step 63). The available data for the expected route 56 is analyzed (step 64). If historical data is available for the route (e.g., historical data stored in internal database 16 and/or external database 18) it is used to estimate the total expected transit energy usage. If no historical data is available, the total expected transit usage is estimated using available data, such as route length, vehicle weight, road types, traffic patterns, etc (step 65). The total expected job site energy usage is then compared to the energy storage capabilities of vehicle 10 (e.g., the capacity and current charge levels of first rechargeable energy source 34) (step 66). The energy storage capabilities of vehicle 10 may be adjusted to account for expected gains while vehicle 10 is operating in a charge accumulate mode when in transit along route 56 to job sites 54.

If the total expected job site energy usage is greater than the energy storage capacity, then hybrid vehicle drive system 12 may be operated in a charge sustain or charge accumulate mode when in transit and reserve all stored energy for job site usage (step 67). First prime mover 30 and/or APU may be operated at job site(s) 54 to provide additional energy. If the total expected job site energy usage is less than the energy storage capacity, then hybrid vehicle drive system 12 may be periodically operated in a charge deplete mode when in transit (step 68). Control system 14 may be utilized to monitor the amount of energy stored in rechargeable energy source 34 and maintain a sufficient energy level for expected job site usage. In one preferred embodiment, vehicle 10 is controlled with a goal to reduce on-site idling to power vehicle 10 and equipment 40 by ensuring that sufficient energy for equipment 40 is present in sources 34 and 38 at the job site. A model of the efficiency of vehicle 10 may reside in the software of the control system 14, fleet management system 17, or in another system such as a cloud based program or storage area. The model can be a mathematical representation that simulates the performance of various hybrid components, the vehicle power train and other inputs in one embodiment. Simulation can be validated against the actual performance of various components and the overall system. Once the model is working, adjustable parameters or software effecting performance of vehicle drive system 12 can be adjusted to determine whether overall efficiency of the vehicle 10 would be increased, or other goals met in accordance with one embodiment. The model may likely reside in a land based server or cloud, but could also be located in the controller of the vehicle 10 (e.g., control system 14) or other component on vehicle 10.

Input may be from vehicle 10 only (vehicle "learns" by adjusting parameters in software and measuring results) or from external sources. Input parameters from a telematics system and/or parameters based upon the route, weather, traffic or other factors that may affect efficiency can be used by the model to determine output parameters that are input into the hybrid, vehicle and/or transmission control system 14. The parameters may be determined by control system 14 or other device on vehicle 10, or may be transmitted to control system 14 via telematics, or some other means of machine to machine communications. Instead of input parameters for the control system software, a more comprehensive set of software instructions or a completely new set of code maybe transmitted to control system 14, with the intent of improving vehicle performance, reducing vehicle fuel use, lowering emissions, improving system performance, optimizing the performance of certain vehicle components, correcting errors in software, or some other benefit. Data from vehicle systems, such as J1939 data, data from sensors in hybrid vehicle drive system 12 or other vehicle systems, such as second prime mover torque, rechargeable energy storage system state of charge, battery temperature, input or output current and/or voltage of rechargeable energy storage, vehicle load information, emissions data or other data (external temperature, grade, humidity, altitude, acceleration vs. power or torque to estimate load, etc.) may be stored in controller system 14, and/or transmitted to fleet management control system 17, and/or sent to remote data storage and processing device or system, such as cloud based storage and software programs. The data is then stored and used for further optimization of the model and output parameters for future vehicles.

Numerous vehicles operating in driving mode and/or job site mode may store data for numerous routes and conditions in an on-board database or an external database, such as cloud based database. The database may then be used to better estimate the best parameters for other vehicles operating in the same area, or in different areas but under similar conditions, terrain and/or job-site activities. The improved parameters or software for system 14 can then be used to further improve fuel efficiency and/or the attainment of previously described benefits. The increasing capability of wireless systems to send and receive data, such as cellular 4G LTE networks or more advanced wireless technology may reduce the cost and increase the speed of sending large amounts of data which can be used to enhance the database of stored information and result in improved operation of system 14 for numerous vehicles. Such a system is particularly advantageous to large commercial fleets with defined operating areas, similar vehicles in operation and similar duty cycles and/or activities performed at a job-site. The storage and use of the historical operating parameters can result in newer vehicles having control system 14 pre-configured for optimal drive and/or jobsite performance and efficiency, which may be particularly advantageous when a new vehicle is used to replace an older fleet vehicle. The method of updating the controller for a specific duty cycle may also provide an advantage when a fleet vehicle is moved from one area to another area, where driving conditions, terrain and other factors, such as activity at the job site may be much different.

A signal from a new or different vehicle entering an area may also be sent to other vehicles near-by or to a fleet management system 17 in order to help determine priority of recharging a rechargeable energy source through the grid.

Priority of recharging may be based upon the state of charge of the battery system, time or date of last recharge, knowledge of future duty cycle (when vehicle 10 will likely be used next and how vehicle is likely to be used) and effect of not recharging (increased fuel consumption estimate), importance of maximum performance (e.g. an emergency vehicle may be deemed to have a higher priority because its rechargeable energy source may be used to enhance acceleration and provide a quiet more productive environment for work at an accident scene), or other criteria.

Control system 14 may use on board logic to determine whether to recharge (determine if grid is overloaded and energy is at a high cost, or if grid has excess generation at a lower cost or provided by a lower emissions generation source, in comparison to other alternatives such as recharging the rechargeable energy source using power from prime mover 20), when to recharge and may communicate with a smart grid so as to coordinate which vehicles recharge at various levels of power or at various times to limit overall loads on the grid or store maximum amounts of energy if the grid is underutilized or has renewable energy available for use in recharging on-board battery systems. Alternatively, control system 14 may transmit parameters to a central fleet management control system 17 or other control system which can remotely determine the charging methodology of the fleet (example, time, rate, amount of grid recharge) and transmit instructions back to control system 14 which may affect the operation of on-board vehicle charger or chargers in response to the remote input.

The central fleet management system or fleet control system 17 or other system may send other signals to an EVSE (Electric Vehicle Supply Equipment), or other equipment connected to a smart grid to assess whether and how a fleet of vehicles should charge or discharge (if bi-directional power transfer to and from the grid is available). The method of transmitting information between vehicles near-by to communicate a request for recharging and communicating the urgency and/or information related to the priority of need to recharge may be especially useful if the electrical grid has limits to the amount of power which can be drawn from the grid at any one time; for example in order to reduce an overload on a transformer or other electrical grid component, grid energy storage device or grid generation device vehicles needing to be recharged may stagger charging times, change charging durations or forego recharging. The smart grid may also transmit data back to controller or control system 14, other on board device with authority to operate on-board charger, or to remote systems with the ability to communicate directly with vehicle 10 to effect operation of on-board charge. The information transmitted to the vehicle may assist the control device to determine on-board charger operation, such as energy rate information, grid load information or other information.

If vehicle 10 has the means for bi-directional transfer of power from the rechargeable energy source to the electrical grid, additional data such as information related to grid peak power (preferable to reduce load to the grid), need for grid power valley filling (preferable to add load to the grid) or grid frequency modulation data (vehicle to grid interface may assist in maintaining proper grid frequency) could be sent to the controller or control system 14 or other device affecting operation of bi-directional on-board charger.

If vehicle imports or exports dc power, other on-board and/or fixed control systems, such as in an EVSE, may be used. As described previously the method of transmitting data may be varied including but not limited to wireless (cellular, wifi, Bluetooth, ZigBee, 4G LTE, CDMA, GSM or other), wired (Power Line Carrier, conductive low voltage, pulse width modulation, or other digital or analog signal), optical (fiber optic, or other means), a combination of those and/or other means.

A similar method of optimization using data collection from sensors during charging may be used to store information from one or more vehicles and the grid, measure the actual effect on the grid, calculate effects on the vehicle rechargeable energy systems and the grid through a model, and subsequently change parameters or control methodology of fleet charging to optimize future recharging events. Optimization may include better capture of renewable energy during periods of low grid utilization, reduced stress on grid components due to recharging of fleet (or other) vehicles, or other benefits related to better control of one or more vehicles connected to the power grid, such as optimization of the energy efficiency of the overall system, including grid recharge process of a fleet and fleet operational efficiency.

Referring to FIG. 5, the progress of vehicle 10 along route 56 can be monitored (step 70). If vehicle 10 has departed from the final job site 54 and is returning to a home location 52, hybrid vehicle drive system 12 may be operated in a charge deplete mode to utilize any remaining energy stored in first rechargeable energy source 34 (step 72). Using remaining rechargeable energy reduces fuel use to a greater extent than returning to the fleet storage lot with a rechargeable energy source that is partially full and has not been used to offset fuel consumption. Recharging the rechargeable energy storage system using grid power is typically much more efficient than not using rechargeable energy to reduce fuel consumption. If vehicle 10 still has to visit one or more additional job sites, the amount of energy stored in first rechargeable energy source 34 is determined (step 74). The stored energy is then compared to the estimated energy needed for the remaining job site(s) 54 (step 76). If the total expected energy usage for the remaining job site(s) is greater than the stored energy, then hybrid vehicle drive system 12 may be operated in a charge sustain or charge accumulate mode when in transit and reserve all stored energy for job site usage (step 77). Reserving the energy in the rechargeable energy system 34 for use at the job site to reduce operation of first prime mover 20 typically is more efficient than using the rechargeable energy in a charge depleting mode during transit, because not having to idle first prime mover 20 typically saves more fuel than incrementally increasing the efficiency of the truck by supplementing the power of the first prime mover with the energy from the rechargeable energy source. First prime mover 20 and/or APU may be operated at remaining job site(s) 54 to provide additional energy if expected energy usage for the remaining job site(s) is greater than the stored energy (e.g., if job site energy usage was underestimated). If the total expected energy for the remaining job site(s) is less than the stored energy, then hybrid vehicle drive system 12 may be periodically operated in a charge deplete mode when in transit (step 78).

With reference to FIG. 4, optional decision blocks 84 and 86 can be included in the method. At a step 84, system 10 can determine if regeneration is possible at the job site. Certain job sites may not be conducive to regeneration due to noise and air quality issues. If not, system 10 advances to step 67 and reserves all stored energy for the job site. If so, system 10 can advance to step 72 or advance to another decision block 86.

At decision block 86, system 10 can determine if regeneration at the job site is more efficient than regeneration during transportation. System 10 may consider a variety of factors for this decision including the type of terrain and route associated with travel to the job site. If not, system 10 can advance to step 67 where all energy is reserved for the job site. If so, system 10 can advance to step 72 and utilize remaining stored energy to assist with the propulsion, thereby using regeneration at that the most efficient portion of the route—the job site. With such an operation, system 10 can minimize regeneration along the route where regeneration is not the most efficient.

Referring back to FIG. 1, the control system 14 utilized to control the operation of hybrid vehicle drive system 12 may take a variety of forms. In one exemplary embodiment, a driver of the vehicle 10 may manually control the operation of hybrid vehicle drive system 12. For example, a switch may be provided for the driver to manually change the operation of hybrid vehicle drive system 12 between a charge deplete, charge sustain, or charge accumulate state. The driver may utilize log sheets and gauges to monitor the operation of hybrid vehicle drive system 12 and estimate power usage. In another exemplary embodiment, a fleet manager may remotely control the operation of hybrid vehicle drive system 12 (e.g., using fleet control system 17). The fleet manager may direct the operation of vehicle 10 based on the expected job types, locations, and number. The fleet manager may further monitor the operation of hybrid vehicle drive system 12 using a wireless communication system. In still another exemplary embodiment, control system 14 may be a computing device that automatically monitors hybrid vehicle drive system 12 and controls the operation of hybrid vehicle drive system 12 utilizing various algorithms.

A control system 14 embodied as a computing device may also be used for other optimized operation of hybrid vehicle drive system 12. Such a control system 14 can be utilized to control the various components (clutches, motors, transmissions, etc.) in system 12. Electronic control systems, mechanical control systems, and hydraulic control systems can be utilized. Such control systems can include sensors and control devices coupled to each component. The control devices can include, switches, clutches, solenoids, converters and other control devices for implementing the functions described herein. In addition, a controller can be provided to indicate a request to operate an accessory or other equipment.

The control system 14 can utilize various input criteria to determine and direct the amount of power required or to be stored, the input criteria can input operator brake and acceleration pedals, accessory requirements, storage capacity, torque requirements, hydraulic pressure, vehicle speed, etc. According to an exemplary embodiment, the input criteria may be an external input, such a from a fleet management system or from a smart grid interface or control signal.

According to other exemplary embodiments, control system 14 may be used for other purposes (e.g., coupling component 28 to transmission 22; monitoring the charge status of first rechargeable energy source 34 and second rechargeable energy source 38; monitoring and managing the thermal status of various components (e.g., prime movers, rechargeable energy sources, electronics, etc.); operating first prime mover 20, second prime mover 30, and accessory 32 to replenish energy in first rechargeable energy source 34 and second rechargeable energy source 38 and/or supply power to equipment 40; operating APU 36 as needed; or control other functions). Information on the status of the system, such as operating efficiency, status of rechargeable energy sources, and certain operator controls may be displayed or accessed by the driver.

Referring still to FIG. 1, according to an exemplary embodiment, control system 14 may monitor sensor devices such as a GPS unit 15 to optimize the operation of system 12 when vehicle is in transit along a route 56. Control system may utilize topographic data from GPS 15 to monitor upcoming elevation changes. For example, if vehicle 10 will approach a hill along route 56, control system 14 may direct vehicle drive system to operate in a charge accumulate mode to charge first rechargeable energy source 34. The stored energy may then be utilized to drive wheels 26 as vehicle 10 ascends the hill. According to another exemplary embodiment, control system 14 may utilize data from GPS unit 15 to plot a route 56 that avoids elevation changes when possible.

Referring still to FIG. 1, control system 14 may monitor the operation of system 12 along a route 56 and collect data to better estimate the expected power usage of system 12 along route 56 and at job sites 54. For example, control system 14 may monitor a wide variety of parameters, such as total vehicle travel distance; fuel economy, brake use; cruise control use; accelerator pedal position; torque, rotational speed, temperatures, and operational times of various devices in hybrid vehicle drive system 12; first rechargeable energy source 34 voltage; and activity of on-board devices such as air conditioner activity, ePTO activity; heater activity, charger activity, etc. The recorded parameters may be utilized to refine initial estimates and create a historical database to provide more accurate estimates for subsequent trips. The recorded parameters may be stored in an internal database 16 or may be transferred to an external database 18 (e.g., via a fleet control system 17). The recorded parameters may be transferred by modem 19 to an external database 18 when vehicle 10 with a wired connection has returned to a home location or with a wireless connection. For example, control system 14 may transmit data on vehicle performance to fleet control system 17 using wireless interface, such as cellular, satellite or wireless area network. External data may also be transmitted using a wired interface through a charge station at a home location. A charge station provides external power from the grid 42 to vehicle 10 in order to recharge first rechargeable energy source 34. Such a signal may be sent through a low voltage communications wire (conductor) or through a digital interface connected to the high voltage conductor. In one exemplary embodiment, control system 14 may communicate wirelessly with a smart phone via a wireless technology such as a Bluetooth connection or a Wi-Fi connection. The smart phone may be loaded with software to store and/or analyze the data or the smart phone may be utilized to transfer the data wirelessly to external database 18. By uploading the data to an external database 18, fleet control system 17 may receive and analyze the collected data from many vehicles and refine power usage estimates and optimized routes in real time.

Additional information from other systems on vehicle 10 may also be transmitted through the same means. For example, equipment 40 may be operated on vehicle 10 to help identify potential problems with the power grid. GPS receiver or unit 15 and other sensors may be used to identify possible problems with the grid along with the time and location of those possible faults. Information is then sent to an external system, such as fleet control system 17, which gathers this information from the various vehicles operating within a fleet to help map out areas of the grid requiring maintenance or repair. In this way, a fleet of vehicles becomes a diagnostic tool to monitor the status and predicted reliability of the power grid.

Use of power at a job site can be monitored by measuring current draw through mover 30 rather than measuring pressure and flow at equipment 40 when vehicle 10 is in an idle reduction mode in one embodiment. Further, power provided by mover 20 can also be monitored if equipment is powered by mover 20. Monitoring energy or power usage at the job site allows to better optimization by control system 14.

Control system 14 can calculate mass of vehicle 10 in one embodiment. Mass can be used to optimize control of vehicle 10 for depletion of energy and accumulation of energy and can be a parameter in the model used by system 14. A highly accurate GPS can measure acceleration in comparison to power output from prime movers 20 and 30 to understand if a vehicle 10 has a higher or lower mass (e.g., f=ma). Alternatively, mass could be measured by comparing power draw with respect to elevation along the route. Changes in elevation along the route can be considered with respect to velocity to calculate mass in one embodiment.

Alternatively, a low cost device can transmit CAN codes to a cell phone. A cell phone app using an accelerometer in the cell phone and CAN codes can approximate mass of vehicle in one embodiment.

Other factors like altitude, grade, tire pressure could be monitored and factored into the mass calculation. Compensation for wind and some other variables can be achieved by calculating averages using acceleration from when vehicle 10 is headed in different directions. Although the term mass is utilized herein, weight can be utilized instead of mass without departing from the scope of the invention.

Approximating the mass of vehicle 10 allows control system 14 to better predict optimum storage levels for rechargeable energy at various parts of a drive cycle. In one embodiment, a lighter vehicle may use a higher depletion rate going up a hill relative to accelerator pedal position in comparison to a more heavily loaded vehicle in which prime mover 20 would need to produce more power up the hill. In both cases the goal would be to deplete the rechargeable energy source 34 substantially by the top of the hill so that energy could be recovered on the way back down the hill, maximizing overall efficiency. Depletion can also be controlled by having a GPS location overlay with a map and topographical information which could be used as an input to control system 14 or a map that had some of the depletion instructions already programmed into it. In one embodiment, system 14 depletes the renewable energy level to a certain percentage at a certain position on the grade.

Driving information can also be used to improve vehicle efficiency. Use information such as torque at certain locations, fuel consumption, rate of consumption, engine power, accelerator position, brake position, and GPS location stamp an be used to increase efficiency, In one embodiment, a record of each measurement can be matched to the route. CAN codes can be sent from low cost device to cell phone via Bluetooth. Route information can be sent to cell phone. The cell phone may use Bluetooth to upload a calibration to a plug-in hybrid controller, or to a controller on a conventionally powered truck to improve efficiency for various driving conditions (traffic), terrain (hills), route (length, number of stop and go, average power required by previous vehicles on the route—potential adjustments for seasonality, weather, day of week, time of day, number of other signals being sent on the same route). A separate cellular connection could be made for each device (CAN message transmitter, cell phone, GPS driver display with optional route information, vehicle control module that interfaces with power train). Data can be gathered and pooled in a database. Some of the data is then analyzed and sent to the fleet manager. Other data can be used as proprietary data to improve performance and efficiency of vehicles through live downloads to vehicle. For example, the charge depleting algorithm or calibration can be adjusted to best use hybrid energy (e.g., electric, hydraulic, air, kinetic (such as through gyro), or combinations of those, etc.) to offset maximum fuel (e.g., diesel, gasoline, bio fuel, CNG, propane, or other).

A detailed map of parameters to increase fuel efficiency could be created and used for other vehicles to improve their efficiency. This data would then be made available to customers to improve fleet, or provide driver behavior bench marks. An advantage of the cell phone app is ability to have fleet management get instant updates (or updates when certain parameters are exceeded (e.g., maximum speed, miles off of route, truck not moving after certain period, etc.) and allow the fleet operator to call the driver or personnel closest to vehicle.

Figure 7:
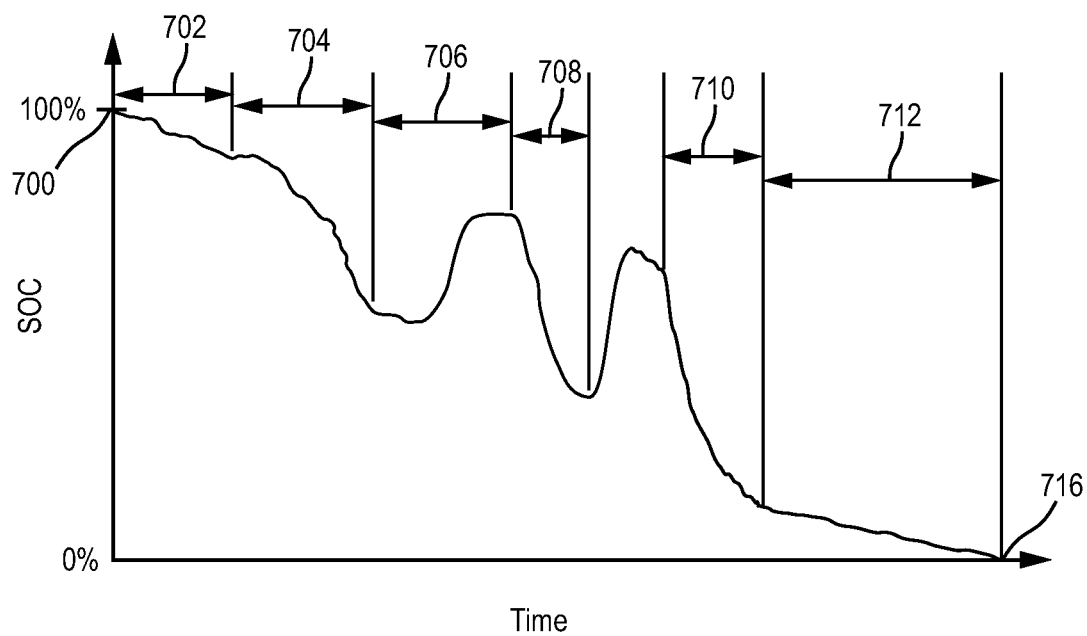
FIG. 7 is a plot of the battery state of charge for a hybrid vehicle as a function of time, in accordance with an exemplary embodiment.
Figure 8:
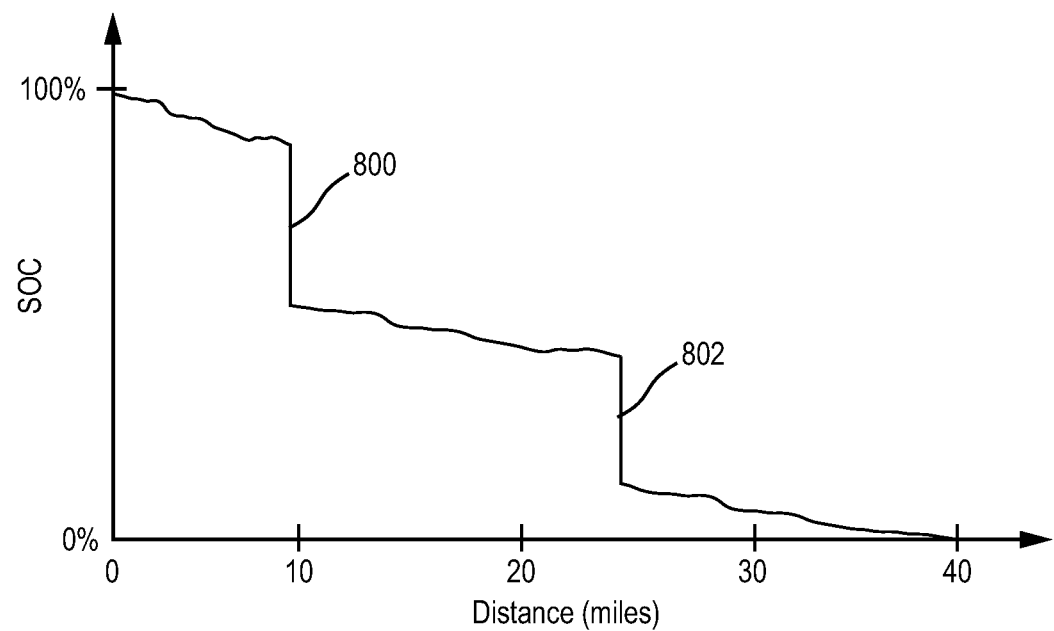
FIG. 8 is a plot of the battery state of charge for a hybrid vehicle as a function of distance, in accordance with an exemplary embodiment.

Referring to FIGS. 7 and 8, plots of the battery state of charge as a function of time and distance, respectively, are shown for a vehicle departing from a home location, travelling along an exemplary route to two job sites, and returning to a home location. As shown in FIG. 7, the vehicle may leave the home location 700 with a fully charged battery (SOC=100%). During a first period 702, a portion of the stored energy is utilized during transit to the first job site. During a second period 704 additional stored energy is utilized by the vehicle at the first job site. In an exemplary embodiment, the portion of the route between the first job site and the second job site includes a large hill. In the approach to the hill 706, hybrid drive system 12 may be operated in a charge accumulate mode to store energy in the battery. Changes in elevation along the route may be predicted using data such as topographical data or historical data collected during previous trips. Stored energy is then utilized as the vehicle climbs the hill 708. As shown some energy may be recaptured and stored in the battery as the vehicle descends the hill. Additional stored energy is utilized in a period 710 during which the vehicle is at the second job site. Any additional stored energy may then be utilized in a period 712 during which the vehicle returns to the home location. Hybrid drive system 12 is configured to allocate stored energy such that the battery is fully discharged upon returning to the home base 716. Job site operations, in which equipment such as hydraulic booms are operated, generally represent the least efficient use of first prime mover 20. Use of first prime mover 20 at job sites can be less desirable due to pollution and noise concerns. As shown in FIG. 8, the vehicle may be operated in charge accumulate mode or charge sustain mode during transit such that sufficient stored energy is available for use at the first job site 800 and the second job site 802 to minimize the idling the first prime mover.

Rhythm-based algorithms based upon past history or predictive algorithms can be utilized to select appropriate modes at various times and locations. Topographical maps/information can be used by the algorithms. The algorithm can also include a temperature or weather input. The algorithm may lessen charge depletion during hot weather and lessen charge depletion in cold weather according to one embodiment. In one embodiment, the algorithm can optimize efficiency to save enough stored energy for use at the job site to reduce job site noise. The job site can be any stationary or low energy operation where use of prime mover 20 is less efficient or undesired. The algorithm can also consider geographic job site consideration such as soil type. For example, more energy may be reserved for job sites with rocky soil conditions in digger derrick applications.

Figure 10:
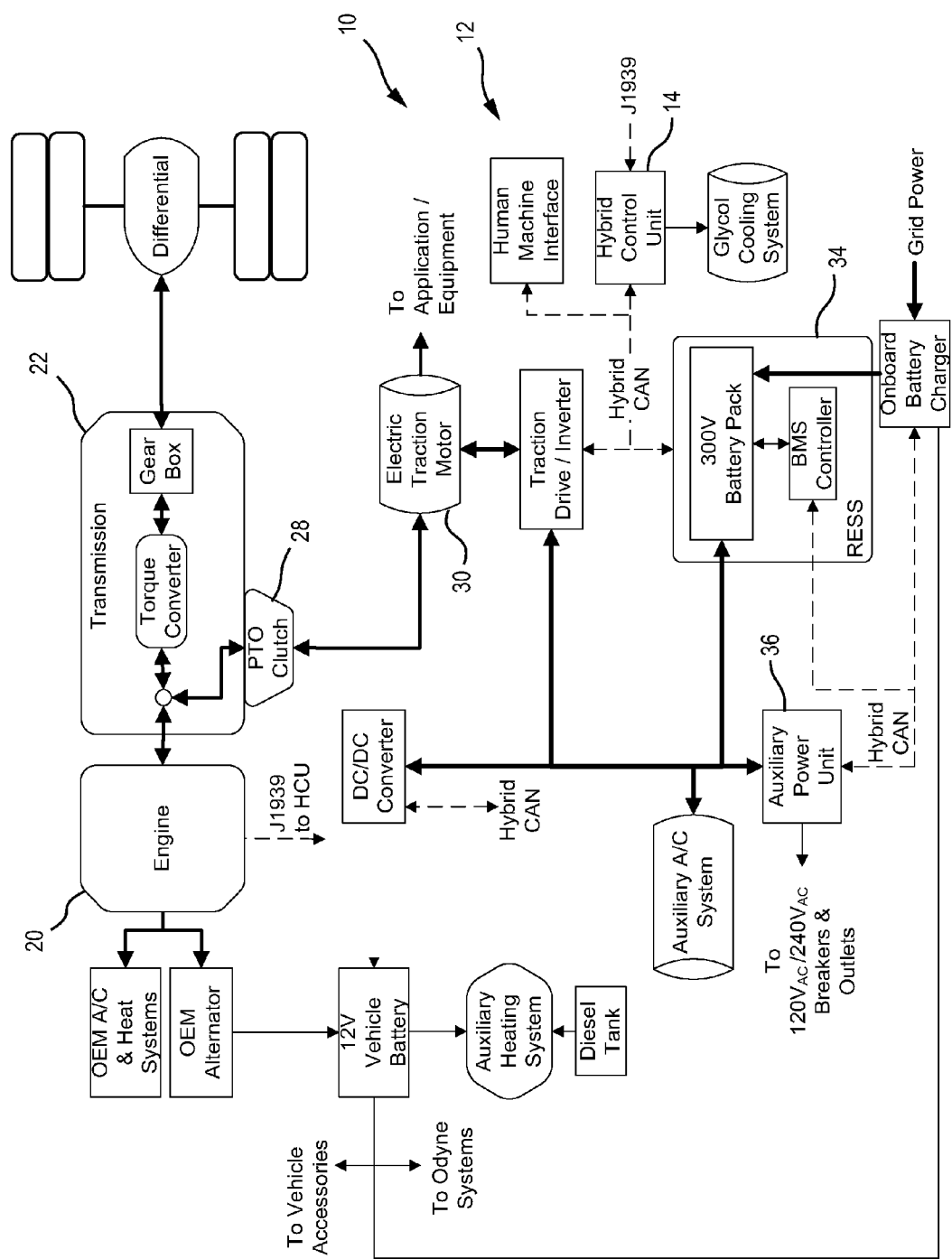
FIG. 10 is a schematic block diagram of an exemplary hybrid vehicle for use with the system illustrated in FIG. 1, in accordance with an exemplary embodiment of the disclosure.

With reference to FIG. 10, an exemplary vehicle 10 is shown. Vehicle 10 includes prime mover 20, transmission 22, component 28, auxiliary power unit 36, rechargeable energy system 34, control system 14, and second prime mover 30. Although a PTO-based hybrid system is shown, other hybrid vehicle systems can be utilized without departing from the scope of the invention.

It is also important to note that the hybrid vehicle drive system and control system, as shown, is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited herein. For example, although bidirectional arrows are shown in the Figures to represent power flow in two directions, the systems can be designed to have power flow in a single direction (e.g., certain bidirectional arrows can be replaced with unidirectional arrows without departing from the scope of the invention). Accordingly, all such modifications are intended to be included within the scope of the present disclosure as described herein. The order or sequence of any process or method steps may be varied or re-sequenced according to alternative embodiments. Other substitutions, modifications, changes, and/or omissions may be made in the design, operating conditions and arrangement of the preferred and other exemplary embodiments without departing from the exemplary embodiments of the present disclosure as expressed herein.

What is claimed is:

1. A system for idle reduction in a hybrid vehicle, the system comprising:
a control system for causing the vehicle to operate in a charge accumulation mode in response to job site data, the job site data including an estimate of the amount of energy expected to be required at the job site, wherein the control system receives the estimate before the vehicle reaches the job site and stores the estimate in an electronic memory, the job site being a location where the vehicle is stationary and uses equipment, the equipment being powered by the vehicle at the job site whereby fuel consumption by the vehicle and consumption of energy stored on-board the vehicle is optimized for use at the job site, wherein the charge accumulate mode is entered during travel to the job site at least in part in response to the estimate being more than an amount of energy stored in a rechargeable energy source.

2. The system of claim 1, wherein the control system includes a vehicle control system and a remote control system, the vehicle control system being in wireless communication with the remote control system.

3. The system of claim 2, wherein the remote control system is a fleet control system, wherein the fleet control system selects a vehicle for a next job site at least in part in response to the amount of energy required at the next job site.

4. The system of claim 2, wherein the vehicle control system communicates with the remote control system through a wireless communication device.

5. The system of claim 4, wherein the wireless communication device is a phone with a Bluetooth or wireless connection to the vehicle control system.

6. The system of claim 1, wherein the control system causes the vehicle to operate in a charge depletion mode, or the charge accumulation mode in response to route data, the control system estimating energy usage to travel to the job site based upon the route data.

7. The system of claim 6, wherein the route data includes at least one of: topographic data, and traffic data.

8. The control system of claim 7, wherein the route data is based upon historical data stored by the control system.

9. The system of claim 6, wherein the job site data includes an indication of whether regeneration is more efficient at the job site than regeneration along a route to the job site, wherein the control system utilizes remaining stored energy to assist with vehicle propulsion if regeneration at the job site is more efficient.

10. The system of claim 1, wherein the control system selects a charge depletion mode for operation of the vehicle in response to the vehicle returning to a home base.

11. The system of claim 1, wherein the job site data includes energy data for types of jobs.

12. The system of claim 1, wherein an electric motor is used in the charge depletion or a charge accumulation mode, the electric motor being coupled to a power take off of an automatic transmission driven by a first prime mover.

13. The system of claim 1, wherein the job site data includes an indication of whether regeneration is possible at the job site, wherein the control system determines if regeneration is possible at the job site and reserves all stored energy for job site usage if regeneration is not possible at the job site.

14. The system of claim 1, wherein the control system utilizes input criteria such as hydraulic pressure to determine and direct the amount of power required or to be stored.

15. A method of optimizing energy utilization by a vehicle with electrical energy storage capability, the method comprising:
receiving a location of a job site on a route, the job site being at the location where the vehicle is stationary and uses equipment, the equipment being powered by the vehicle at the job site whereby fuel consumption by the vehicle and consumption of energy stored on-board the vehicle is optimized for use at the job site;
determining expected energy use while the vehicle is stopped at the job site and storing an expected energy use factor related to the expected energy use at the job site using an electronic processor, wherein the expected energy use is determined before the vehicle reaches the job site;
determining if the expected energy use is greater than stored energy in at least one rechargeable energy source aboard the vehicle using the electronic processor; and
operating the vehicle in a charge depletion mode along the route if the expected energy use is less than the stored energy in the at least one rechargeable energy source aboard the vehicle, wherein the charge depletion mode is selected by the electronic processor in response to the second determining step.

16. The method of claim 15, further comprising:
operating the vehicle in a charge accumulation mode along the route if the expected energy use is more than stored energy in the at least one rechargeable energy source aboard the vehicle.

17. The method of claim 15, further comprising:
operating the vehicle in a charge depletion mode along the route after a last job site has been visited if stored energy is present in the at least one rechargeable energy source.

18. The method of claim 15, further comprising determining the expected energy use along the route.

19. The method of claim 15, wherein a fleet control system provides the expected energy use to the vehicle or the expected energy use is based upon a historic use of energy.

20. The method of claim 15, wherein the expected energy use and the stored energy are updated periodically.

21. The method of claim 15 further comprising receiving locations of a plurality of job sites on the route, and determining expected energy at each job site along the route using job site data for the locations, and operating the vehicle in a charge accumulation mode or the charge depletion mode along the route in response to the job site data.

22. An apparatus, comprising:
a control system for causing a vehicle to operate in a charge depletion mode, or a charge accumulation mode in response to a command along a route to a job site; and
a command control system for providing the command in response to job site data, the job site data including an estimate of the amount of energy expected to be required at the job site, the job site being a location where the vehicle is stationary and uses equipment, the equipment being powered by the vehicle at the job site, the estimate being a prediction of the amount of energy expected to be required at the jobsite made prior to the vehicle reaching the job site, whereby fuel consumption by the vehicle and consumption of energy stored on-board the vehicle is optimized for use at the job site.

23. The apparatus of claim 22, wherein the command control system provides the command in response to stored energy in rechargeable energy sources, wherein the control system causes the vehicle to operate in a charge sustain mode when the stored energy is at an appropriate level for the estimate of the amount of energy.

24. The apparatus of claim 23, wherein the command is provided continually as the vehicle is used throughout a route with multiple job sites.

25. The apparatus of claim 22, wherein the command control system includes a vehicle command system and a remote command system, the remote command system storing historical energy usage data.

26. The apparatus of claim 22, wherein the equipment includes one or more of the following: electrically powered devices, hydraulically powered devices, air powered devices, or on board vehicle systems.

27. The apparatus of claim 26, wherein the equipment includes one or more of an aerial bucket, compressor, tools, lights, air conditioner, and heater.

28. The apparatus of claim 22, wherein the equipment is located at one or more of the following locations: on vehicle, external to vehicle, in a building, or on a grid.

29. A system for idle reduction in a hybrid vehicle, the system comprising:
a control system for causing the vehicle to operate in a charge accumulation mode in response to job site data, the job site being a location where the vehicle is stationary and uses equipment, the equipment being powered by the vehicle at the job site whereby fuel consumption by the vehicle and consumption of energy stored on-board the vehicle is optimized for use at the job site; and
a user interface for selecting an ePTO mode where an electric motor provides a PTO operation without power from a prime mover, the user interface allowing the driver to select the ePTO mode, wherein the ePTO mode is entered at least partially in response to a parking brake being engaged.

30. The system of claim 29, wherein the user interface allows a charge sustain mode to be chosen by the driver.

* * * * *